(12) United States Patent
Bielfeldt et al.

(10) Patent No.: US 6,189,438 B1
(45) Date of Patent: Feb. 20, 2001

(54) FILTERING DEVICE, FILTER ELEMENT AND METHOD OF MANUFACTURING THE FILTER ELEMENT USED FOR THE PREPARATION OF BREWED BEVERAGES

(75) Inventors: Uwe Bielfeldt, Bad Soden; Christof Kleemann, Eschborn; Reinhard Stücher, Freudenberg; Bernd Trebitz, Butzbach; Horst Emmerich, Eschborn; Dieter Friedrich, Eppstein; Christian Ziesch, Friedberg; Frank Gliemroth, Schwalbach, all of (DE)

(73) Assignee: Braun GmbH (DE)

( * ) Notice: Under 35 U.S.C. 154(b), the term of this patent shall be extended for 0 days.

(21) Appl. No.: 09/382,751

(22) Filed: Aug. 25, 1999

Related U.S. Application Data

(63) Continuation of application No. PCT/EP98/00864, filed on Feb. 16, 1998.

(30) Foreign Application Priority Data

Mar. 13, 1997 (EP) ................................. 97 104 260

(51) Int. Cl.⁷ ............................. A47J 31/08; B01D 23/28
(52) U.S. Cl. ................................. 99/321; 99/322; 99/323; 99/306; 210/493.5
(58) Field of Search ............................. 99/323, 322, 306, 99/307, 308, 279, 295; 210/493.1, 493.5

(56) References Cited

U.S. PATENT DOCUMENTS

| 1,615,542 | 1/1927 | Gros . |
| 2,546,874 | 3/1951 | Siegrist . |
| 3,089,405 | 5/1963 | Ackerman . |
| 4,374,026 | * 2/1983 | Greutert ........................... 210/493.5 |
| 4,735,719 | 4/1988 | Benedict . |
| 5,171,457 | 12/1992 | Acuff et al. . |

FOREIGN PATENT DOCUMENTS

| 40 38 023 | 6/1992 | (DE) . |
| 0 253 246 | 7/1987 | (EP) . |
| 0 741 988 | 11/1996 | (EP) . |
| 2 691 059 | 5/1993 | (FR) . |

* cited by examiner

Primary Examiner—Reginald L. Alexander
(74) Attorney, Agent, or Firm—Fish & Richardson P.C.

(57) ABSTRACT

The invention is directed to a filtering device, a filter element therefor and a method of manufacturing the filter element (28) from filter paper. The filter element (28) has a receiving cavity (76) to be filled with extractable materials such as coffee grounds or tea leaves. Following contact with hot water, the extractable materials deliver extractive substances to the water, resulting in a brewed beverage that is drained from the filter element (28). During this process, the filter element (28) is held by the filter support (1) by way of a supporting member which includes a rim (39) formed on the filter element (28) and having a bearing surface (40), and a supporting surface (24) formed on the filter support (1). The rim (39) of the filter element (28) is reinforced mechanically by providing the filter paper with exposed pleats (42, 51, 52) which cooperate with corresponding elevations (115) and recesses (79) formed on the supporting surface (24) of the filter support (1). Such a filtering device of the present invention enables its manipulation and manufacture to be significantly facilitated. At the same time, improved brewing results are obtained. The operations of inserting such a filter element (28) in a filter housing (16) and filling it with coffee grounds, for example, are also improved. It is possible to manufacture a plurality of filter elements (28) in a single operation. At the same time, the filter elements are stackable in a minimum of space. The filter element is held in the filtering device without any additional fastening.

25 Claims, 10 Drawing Sheets

FILTERING DEVICE, FILTER ELEMENT AND METHOD OF MANUFACTURING THE FILTER ELEMENT USED FOR THE PREPARATION OF BREWED BEVERAGES

This is a continuation of PCT application serial no. PCT/EP98/00864, filed Feb. 16, 1998, which claims priority from European application serial number 97104260.1, filed Mar. 13, 1997, (pending).

BACKGROUND OF THE INVENTION

This invention relates to a filtering device for making brewed beverages. Furthermore, a second invention relates to the filter element insertable into the filtering device referred to above. Finally, a third invention relates to the method necessary for manufacturing the filter element.

From U.S. Pat. No. 3,089,405 there is already known a filtering device for a coffee maker serving to prepare brewed beverages. The filtering device is comprised of a ring-like portion of a water pipe, briefly referred to as ring pipe, on the outside of which a filter sack is freely suspended. The filter sack is adapted to be filled with coffee grounds, and hot water can be introduced through the filter sack's mouth for the purpose of filtration. The hot water entering through the open end of the annular water pipe, upon taking up extractive substances from the extractable material (process of extraction), is drained freely along the outer wall of the filter sack to be received in a container placed underneath.

For installation, the filter sack is secured to the filter support using holding means. For this purpose, an elastic band or an elastic string is drawn into the filter sack's upper end, which band or string, together with the mouth of the filter sack, is pulled from outside around the ring pipe configured as the filter support. After the widened mouth of the filter sack above the ring pipe is released, the elastic string will be shirred in such a way that the diameter of the filter sack above the ring pipe becomes smaller than the section around the ring pipe. In this manner, the filter sack is secured to the ring pipe and hence prevented from falling down during the brewing cycle.

Aside from the relatively complicated procedure of securing the filter sack upon the ring pipe—requiring the mouth of the filter sack to be opened by pulling the elastic string apart until the sack can be fitted over the outer surface of the ring pipe from below—, a highly elaborate process is involved to draw an elastic band or an elastic string into the upper end portion of the filter sack to make sure that the elastic string secures the filter element on the filter support.

Such securing of a filter sack to a filter support of a beverage brewing apparatus is an elaborate and complicated procedure depending ultimately on the operator's skills in opening the mouth of the filter element, fitting it over the ring pipe, and subsequently aligning the filter element on the filter support to make sure that the longitudinal axis of the filter element extends essentially perpendicularly; in the event of an improper installation, the paper filter sack tends to be askew, to tear and/or even detach itself from the filter support, entailing the risk of an operator scalding himself or herself.

The need to use an elastic string or rubber band fitted to the filter element as an extra addition and the elaborate assembly of this rubber band to the filter sack is far from comfortable and adds to the unit price of the filter sack, which makes itself felt clearly in particular in cases where coffee is brewed several times a day. Such mounting of a filter sack is in all likelihood only suitable for use where the sack itself is made of a stable filter material.

Furthermore, from EP-A-0 741 988 a filtering device is known in which the filter element is assembled from two shell-shaped paper strips to form a single piece. In the area of its mouth the filter element has a free rim which is folded over such as to form a pocket. The pocket opens in downward direction, extending essentially in the direction of the wall of the receiving area. The filter support comprises a substantially round section of a circle bent from wire and having bent thereon a wire-shaped holder and a stud member at the opposite ends. The semicircular sections of the holder serve to hold the filtering device, while the diametrically opposite supporting sections serve to support the filtering device on the rim of a vessel.

If in this filtering device the ring member is not accurately at the deepest point of the pocket, that is, at the location where the rim is folded towards the filter body, it cannot happen that the rim opens upwardly causing the filter element to fall down due to its weight increase as the water slowly penetrates the coffee grounds, the receiving cavity and in consequence also the rim of the filter element during the brewing cycle, because the filter layers and the rims are made of a composite fabric of heat-sealable fibers or similar woven fabrics, these elements being even connected by heat sealing this composite fabric or by similar means. The costs for such a filter element made of a composite fabric are however, considerable, particularly when this filter element is intended for use as a disposable filter involving high quantities. When used as reusable filter the same cost considerations apply as mentioned in the foregoing.

From DE-40 38 023 A1 a method of manufacturing a two- or multi-shell container from paperboard or a similar material is known as described in the prior-art portion of patent claim 31. In this method, the paper, also referred to as the blank, is drawn from the edge side of the die half in addition to being drawn from the blank side while further material is fed. In this process, stock present between the two die halves is available to compensate for the forming of the paper in the die cavity, without the material being subjected to excessive strain. In this method, therefore, a receptacle is formed by feeding in stock.

From U.S. Pat. No. 5,171,457, in particular from FIG. 6, a rimmed coffee filter container cup is known into which an equally rimmed coffee filter is insertable in accordance with FIG. 7. In this arrangement, the rim of the coffee filter takes support upon the rim of the coffee filter container cup. The cylindrical wall of the cup-shaped coffee filter has exposed ruffles shaped in a zigzag configuration and oriented outwardly. The exposed ruffles continue in the rim extending at approximately right angles to the cylindrical wall by being apparently pressed together in the rim.

Finally, from FR-A-2 691 059 a filter cartridge made of filter paper is known whose mouth is provided with a rim extending away from the filter cartridge at approximately right angles thereto. The mouth of the filter cartridge is closed with a filter paper lid extending over the rim. The rim ensures a perfect position of the filter cartridge in the interior of a metal filter of a coffee maker.

SUMMARY OF THE INVENTION

It is accordingly an object of the first invention to provide a filtering device of the type initially referred to, with which very good brewing results are obtained at a short brewing time and at low manufacturing cost and which affords particular ease of handling. It is an object of the second invention to configure the filter element utilized for the filtering device in a particularly simple and manageable fashion, ensuring a stable mounting in the filter support without the need for additional components while being of a particularly straightforward and economical construction. Finally it is an object of the third invention to provide a method of manufacturing this filter element of the invention, which method enables also a thin filter element to be manufactured with ease, at low cost and in high quantities without subjecting the material to excessive stresses, strains and loads.

The object of the first invention is achieved as follows. By providing the rim with the exposed pleats, the filter element manufactured from conventional filter paper is stiffened in an axial direction, enabling its large bearing surface to bear against the supporting surface formed on the filter support. By virtue of the stiffened rim, the operation of inserting the filter element into the filter support is facilitated until subsequently the rim of the filter element bears against the supporting surface of the filter support. The awkward procedure of unfolding the filter element by hand is not necessary for insertion of the filter element into the filter support because the filter element already possesses its final shape necessary for the brewing operation. By reason of the stiffened rim, the filter element maintains its shape when suspended in the filter support also when the filter paper is imbibed with water. In this configuration, both the exposed pleats and the rim itself contribute to the stiffening of the filter paper, obviating the requirement of having to provide external stiffening means. As filter paper conventional filter paper qualities for electrically powered or other beverage making units for domestic use may be employed.

The term exposed pleats as used herein means that not a single section of the pleats' surfaces is concealed in the direction of the longitudinal axis of the filter element, that is, in the direction in which the individual filter elements are separated from each other, meaning that when looking down on the imaginary longitudinal axis of the filter element, practically the entire surface of the filter element has to be visible, similar to a flat filter element in which however the surfaces are visible not in shortened form because of the absence of a slanting configuration, but which is precisely the case with the three-dimensional configuration of the ring member and the wall of the receiving area.

According to the present invention, the formation of exposed pleats results in a particularly large bearing surface in the rim area of the filter element, with the effect that a particularly large load-bearing surface is obtained in the rim area of the filter element in order to thus distribute the relatively high forces bearing on the filter paper as a result of the wet coffee cake to a large paper surface of the filter element. The occurring tensile stresses—which are essentially the only stresses occurring with the filter paper wet— are thereby maintained at a level below the tensile stresses permissible for the filter paper employed. This makes it possible to use particularly thin filter paper with good perviousness to extractive substances, producing the advantageous effects of both a low price of the filter element of the invention and an excellent quality of the beverage, particularly coffee. It will be understood, of course, that it is not necessary for the elevations and recesses formed on the supporting surface of the filter support to correspond exactly to the number of elevations and recesses of the filter element, a lower number being likewise possible. In cases where fewer recesses and elevations are formed on the circumference of the filter support, it must only be ensured that these be spaced on the periphery such as to still register with the elevations and recesses of the filter element.

With the first invention a particularly simple filtering device is provided in which the filter element, owing to its handling convenience, is readily insertable into the filter support until it is suspended freely in the filter support, its rim then bearing with the filter element's full weight, inclusive of the weight of the coffee grounds, against the supporting surface of the filter support. No additional parts are needed to serve as holding means for the filter element. Such a freely suspended filter element manufactured solely from filter paper, in combination with the filter support of the present invention, produces particularly good extraction results on brewing, because it enables the hot water to be drained almost freely along the outer surface of the filter element. This also results in a comparatively speedy passage of the hot water through the material being extracted, in particular coffee grounds, preventing bitter principles and other undesirable flavors from being extracted from the coffee grounds and dissolved in the hot water. The result is a particularly aromatic and tasty coffee beverage. Because the hot water passes through the coffee grounds relatively speedily and uniformly to enter a container provided beneath the filtering device, the liquid cools hardly noticeably between the moments of entering and leaving the filtering device, so that the brewed beverage has an optimum temperature also after the extraction cycle without the provision of external heating.

Apart from facilitating its manufacture, greater handling convenience of the filter element can be obtained because the rim forms the end of the mouth of the filter element. While it is entirely conceivable to arrange the rim, by pleating, in the mid-area of the filter element if the dimensions of the filter support were such as not to permit it otherwise, this solution however would then require the area of the filter element projecting upwardly beyond the rim to be configured such as to maintain its shape also under wet conditions.

Because the area of the filter element bounding the receiving cavity is likewise provided with pleats engaging in mating elevations and recesses formed on the filter support, this area, too, carries a certain share of the supporting function, supporting the filter element also in this particular area. At the same time, the function of locating the filter element centrally is additionally improved through this area. By reason of the increased surface of the area bounding the receiving cavity, which is obtained by the pleats provided here additionally, the load-carrying capability of the filter element is enhanced also in this area so that the filter element, even when wet, holds the equally wet coffee cake on the filter support without the risk of the filter element slipping off of the filter support or, still worse, tearing because of excessive load on the filter paper material.

It should be noted in this connection that in the filter element of the present invention the diameter in the transition from the area bounding the receiving cavity to the rim should always be somewhat greater than the opening surrounded by the supporting surface of the filter support, in order to ensure that the rim of the filter element can rest against the supporting surface with its entire bearing surface. As the filter element is inserted into the filter support, the area of the filter element's receiving cavity bounding the supporting surface of the filter support should be resiliently urged radially inwardly until the bearing surface on the rim of the filter element rests flush against the supporting surface. As a result the filter element resides always snugly within the filter support, while at the same time being located centrally by the filter support. Accordingly, the area bounding the receiving cavity should always be urged resiliently against the filter support in its transition area, thereby further improving the support of the filter element in the filter support itself as well as the handling convenience during insertion of the filter element. The snug seat of the filter element in the filter support enables an operator to have better control of the individual manipulations, avoiding damage to the filter element. As soon as the filter element then becomes wet in the brewing cycle, these tensile stresses disappear, yet with the consequence that the filter element continues to cling to the filter support.

In lieu of the transition area formed by a substantially wider surface area, it is also possible to use a basket which is open downwardly in the direction of flow, or a basket may adjoin the transition area. In this arrangement, for example, the basket may be injection-molded onto the filter support as an integrally formed piece, or alternatively the basket may be inserted into the filter support as a separate part in a subsequent operation. The basket is comprised of individual braces to minimize the areas of contact with the outer surface of the filter element in order to thus enable a nearly unrestrained discharge of the brewed beverage. The basket serves as an ancillary holding means for the filter element in addition to the supporting surface, while on the other hand locating the filter element in the filter support centrally.

Other features are provided to enable the brewed beverage to be drained along the outer surface of the filter element practically freely. In this arrangement, the braces are disposed above the filter element substantially at a level where they practically present no impediment whatsoever to the passage of the brewed beverage through the filter element.

In a further configuration of the present invention, the supporting surface of the filter support and the bearing surface of the filter element are configured in such fashion that during the brewing cycle a water layer penetrates between the filter element and the filter support, provoking in this area an adhesive effect which in turn further contributes to additionally securing the filter element onto the filter housing. Hence these additional securing means do not take effect until after the filter element is imbibed with liquid, that is, after the coffee cake has become particularly heavy due to the take-up of water. The effect of adhesion which then sets in makes it even possible for the bearing surface of the filter element to be reduced without the water-imbibed and hence relatively heavy filter element, inclusive of the wet coffee cake, slipping out of the filter support. Because the filter paper utilized for the filtration of extractable materials has fine pores, being thus of a microporous structure, liquid creeps particularly well along the still dry wall of the filter element into the transition area and onwards into the rim due to the capillary action occurring when the coffee grounds held in the receiving cavity of the filter element become wet.

With this additional support provision on the filter element, it is possible to employ extremely thin filter papers without these papers slipping out of the filter support. It is precisely when filter paper becomes wet, hence losing its flexural rigidity nearly completely, that the effect of adhesion produces an additional holding force refraining the filter element from losing its original shape in addition to causing the filter element to be still held securely in the filter support. To obtain maximum possible adhesive forces, it is advantageous for the bearing surfaces of the filter element on the filter support to be particularly large. This is accomplished by the exposed pleats on the one hand and by the relatively large diameter of the filter element on the other hand.

In a filter element in which water is prevented from entering the rim area, which may be accomplished, for example, by providing on the filter element a waterproofing layer such as plastic or similar liquids entering the filter paper, the stiffness of the filter element is nevertheless ensured although the effect of adhesion cannot occur in the then dry rim area, because the pleats operate to provide for sufficient reinforcement or stiffness of the rim and, where applicable, of the transition area as well. It is thus for the first time that a suspended filter element manufactured from filter paper is provided in simple manner, which takes support within the filter support securely without additional supporting means. In consequence, handling advantages and a better brew result.

In another embodiment, seating engagement of the filter element with the filter support is improved in that the angle between the supporting surface of the filter support and the vertical axis of the filtering device is smaller than or equal to 90°. In this configuration, the filter element virtually hooks onto the outwardly slanting and downwardly extending supporting surface of the filter support, the force exerted on the filter paper being at its maximum in particular in the corner at the junction of the bearing surface with the transition area of the filter element.

Although the above-described holding approaches for the filter element (rim, transition area, basket, radial bias of the filter element in the transition area and adhesion) are perfectly sufficient, the added possibility exists to select a retaining device which, acting against the rim of the filter element, urges the bearing surface of the filter element against the supporting surface on the filter support. In this arrangement it is sufficient for the retaining device to rest lightly, by its own weight, on the outer surface of the rim of the filter element on the side facing away from the bearing surface. In addition to the adhesive effect, the retaining device exerts a bearing force on the rim of the filter element. The retaining device may be fabricated from plastic or some other material affording ease of manufacture. Alternatively, it may also be part of a ring arrangement adapted to swing upwards on the filter support, which ring arrangement is urged against the rim's upper supporting surface upon insertion of the filter element.

In yet another embodiment, a free hanging filter element is provided having its outside encompassed by a relatively spaced shell-shaped filter housing structure in a thermally insulating fashion. Preferably, this filter housing structure may be of a transparent plastic material to enable an operator to watch the brewing and draining cycles of the filter element from outside to be thus able to detect the end of the filtering cycle. An ellipsoid has proven to be particularly advantageous for the contour of the filter element because this shape enables the hot water entering the filter element to be distributed uniformly radially outwardly from the center. As a result, hot water penetrates the coffee grounds with maximum possible uniformity throughout, so that optimal utilization of the coffee grounds is accomplished also where only small quantities are involved. As an ellipsoid a substantially hemispherical outer surface has proven to be useful whose draining area covers a larger radius than the remaining area and whose transition area proximate to the rim follows the generating surface of a truncated cone. While the draining area on the filter element with the less pronounced radius has the effect of reducing the draining period, the frusto-conical transition area on the filter element enables a better engagement surface to be obtained on the conformably shaped area of the filter support while on the other hand facilitating the forming of the filter element and the filter support in this particular area when this area extends above the center of a hemisphere.

In still another embodiment, the filter support is composed of two or more parts. Such a solution is appropriate when the supporting surface for the filter element is part of an intermediate member fabricated from single braces, which member takes support upon the filter support proper. As a result, both the intermediate member and the filter support afford greater ease of manufacture because of greater simplicity of the forming dies, and these parts can be cleaned by hand more easily and effectively because they are separable from each other. In this embodiment, the bearing surface of the filter element is able to bear against the supporting surface of an intermediate member which in turn bears against the filter support. Alternatively, the intermediate member may also be first hooked or clipped or otherwise secured to the transition area of the filter element. In any case, in this arrangement the intermediate member combines with the filter support to form the filter support proper for the filter element. However, if required by injection molding considerations, manufacturing the filter support from more than two parts and assembling it to form a "complete filter assembly" may be contemplated as well.

In still yet another embodiment, in combination with the filtering device of the present invention, a beverage making apparatus suitable for domestic use is provided. In this apparatus, the water held in a water reservoir of the beverage maker is supplied to a water through-flow heater where it is heated and directed preferably through a riser to the mouth of the filter element where it flows onto the surface of the coffee grounds or the tea leaves, distributing itself uniformly in the receiving cavity. Upon extraction, the beverage is drained through the lower discharge point of the filter element directly or through the housing of the filter support into a container placed underneath. However, it is also entirely conceivable to place the filtering device onto a container and perform the filtering by hand.

In another aspect, the invention relates to the filter element itself which is fabricated from filter paper and has a mouth and a receiving cavity to be filled with extractable materials such as coffee grounds or tea leaves. The filter element has a rim extending in a direction away from the receiving cavity, which rim is reinforced by exposed pleats. By means of its rim, the filter element is readily seatable on a conformably shaped rim, bearing against it. The exposed pleats of the present invention not only stiffen the rim area but also increase its resistance to tearing and its flexural stiffness because of reinforcement of the material. Such a filter element affords ease of handling and is sufficiently elastic when inserted into a filter support conformed to the shape of the filter element. Handling convenience is ensured because the filter element has its final shape already prior to insertion. Such filter elements are stackable in nests requiring a minimum of household storage space. In this manner, it is also possible to produce several filter elements in a single operation, using several filter papers in superposed arrangement.

The exposed pleats may be formed either in only the rim or only the transition area, or ultimately on both parts. In the use of the exposed pleats, a particularly flexible filter element results which invariably returns to its initial position even when subjected to major deformations from outside. In this embodiment, a highly elastic and yet dimensionally stable filter element in dry condition is obtained which, by reason of the exposed pleats, is radially compressible in diameter. During the brewing cycle the filter element takes support in the filter support securely although it undergoes a stability variation as it changes from dry to wet.

In another embodiment, the area bounding the receiving cavity is also pleated. In this arrangement also this area is reinforced by overlapping paper in addition to the rim in order for the stability of the filter element to be increased in this particular area.

If the pleats extend in the longitudinal direction of the filter element in accordance with the features maximum tensile strength is achieved in the transition area and on the rim of the filter element. In this arrangement the pleats are maintained nearly unchanged. The most favorable pleat arrangement is obtained when the pleats extend radially outwardly, beginning at some distance from the draining area on the circumferential surface of the filter element. In this arrangement, the depth of the pleats increases radially outwardly, reaching its maximum in the rim area. The increase in pleat depth may proceed continuously or in steps.

In order to be able to better reduce the tensile forces occurring on the filter element in the area of the receiving cavity, which forces are due to the weight of the wet coffee grounds and the wet filter paper as well, the features make provision for a sharp corner or sharp edge in the range from 0.2 mm to 1 mm at the junction of the rim with the transition area of the filter element. It is thereby ensured that the bearing surface rests on the supporting surface, bearing against it uniformly. According to the filter element is integrally made of filter paper with a gsm substance of 20 to 60 $g/m^2$, preferably 35 $g/m^2$. The use of thinner filter paper material is hardly possible because then the load on the filter paper when filled to maximum capacity becomes too high during brewing, entailing the high risk of tears occurring in the filter paper.

With the features the shape of the area of the filter element bounding the receiving cavity is determined. Such an ellipsoidal shape has proven to be optimal for filtering coffee, because the hot water penetrates nearly uniformly all areas of the coffee grounds. However, because of the increased discharge rate, it is therefore necessary for the supply of hot water to be suitably adapted.

According to another aspect of the invention it is possible to continue those pleats that extend from the transition area bounding the receiving area towards the rim and farther over the corner into the rim of the filter element, yet then in reverse form. Hence, when looking down onto the filter element, it will be seen that a pleat having its sides facing each other extends from the transition area to the corner, whilst it extends from the corner to the rim as a pleat having its sides facing away from each other, that is, on the rim a trough pleat turns into a crest pleat. In this arrangement, it is irrelevant whether the pleats are of an undulating or zigzag configuration. The corner invariably follows a zigzag or undulating course common to both the trough and the crest pleats.

In order to adapt the loadable area of cross-section of the filter element to the weight increasing in the direction of the rim, the paper cross-section increases in the direction of the rim, preferably at a substantially constant rate. This is accomplished in that the number of pleats on the circumference of the filter element increases in the direction of the rim. This increase in load-carrying ability towards the rim can be further assisted by the increasing the depth of the pleats in the direction of the rim of the filter element. It is only in this way that the filter element can be based on a flat round blank of paper.

In still another embodiment, a tab serves to facilitate the removal of a filter element from the stack.

In accordance with another aspect of the invention, a method of manufacturing a formed part to be shaped from paper is provided, in which the formed part is a filter element made of thin filter paper and having a mouth and a receiving cavity to be filled with extractable materials such as coffee grounds or tea leaves. The filter element has a rim which extends in a direction away from the receiving cavity and is reinforced by pleats. This filter element is formed by pleating the filter paper as it is inserted into the die cavity, so that the filter material is not subjected to excessive strain. Accordingly, the shape of the filter element is such that the resulting excess material is distributed in spatial areas constituted by pleats. With this method it is possible to integrally form a filter element made from thin filter paper. Such a method enables a filter element to be formed to any desired shape. This method is particularly suitable for use on filter elements in which an ellipsoidal outer contour is adjoined radially outwardly by an annular rim. For the manufacture of filter elements, this is an extremely simple, economical and time-consuming method.

Sill other features are provided to impart a particularly stable final shape to the rim of the filter element. The reinforced rim adds to the dimensional stability of the filter element itself, improving its handling convenience. However, it is also possible to reinforce the entire filter element or further parts thereof in this manner.

With the two-piece configuration of the blankholder, the outer ring holds the filter paper in place as it is drawn into the die half. In this process, the inner ring may contribute to the holding function as well. With the use of two independently operating blankholders acting on the filter paper with different forces, better control of the filter paper feed operation is possible. Thus the application pressure of the inner blankholder against the filter paper during feeding can be lower than the application pressure of the outer blankholder in order to prevent the requisite forming forces on the filter paper at the junction of the rim with the transition area from becoming excessive during feeding, which could easily cause tearing of the filter paper. Control of the application forces can be effected by raising or lowering the blankholders. However, as soon as the filter element forming operation is completed, the inner blankholder contributes to applying counter-pressure against the filter element, whilst the outer blankholder is not required to assume a function for processing the filter paper. The blankholder parts may also be formed of a single blankholder which then assumes all the functions.

Other features are provided in order to prevent the filter paper from slipping out of location within the die, so that a filter element as concentric as possible results from the forming operation.

According to still other features, the locating means include a movable retainer adapted to travel in and out of the die half.

According to further features, the locating means may be produced by forces of suction or pressure. However, other locating means as, for example, projections or recesses to be provided on the filter element and engaging in centering devices on the die assembly may also be contemplated.

In a further embodiment, the surfaces of the die parts are configured in such fashion as to ultimately bring the filter element into the desired final form. The surfaces of the dies extend such that during the process of manufacturing a filter element pleats are produced which are free from undercuts, hence extending as exposed pleats. This enables the placement of several layers of filter paper into the die in order to thus manufacture a major number of filter elements in a single operation. How many layers of filter paper can be inserted depends on the thickness of the paper and on the forming die.

Advantageously, ten to twenty circular filter paper blanks for manufacturing filter elements in a single pressing operation have proven to be suitable. In this process, the punch half presses all the round blanks into the die half simultaneously.

Other features the invention enable the flank areas of the crest and trough pleats of the filter element to be drawn by the filter element forming die in order to prevent the flank areas from resting against the forming die walls during pressing. Unwanted additional pleating within the desired pleats is thereby avoided during pressing, which is the prerequisite to enable the removal of the individual filter elements from the filter stack.

In yet another embodiment, the formation of pleats is predetermined, and hence in particular facilitated, by the prior operation of producing pressed edges in the filter paper blank.

It will be appreciated that it is also possible to produce the filter element first without rim and subsequently forming the rim using a plurality of movable punch halves which are distributed on the circumference and fold the rim radially outwardly, pressing it into shape.

In still yet another embodiment, the smooth structure of die half, punch half and blankholder enables filter elements with closed pleats to be obtained, in which event however the filter elements have to be produced one by one. In this process the pleats occur by their own accord, being hence pressed into overlapping pleats subsequently. Because the pleats are closed, this method enables the production of only a single filter element at a time. The closed pleats are subsequently intensified by pressing die half, punch half and blankholder firmly against each other, as a result of which the filter element is pressed between these parts. This enables a particularly stable and yet elastic filter element to be obtained.

Several embodiments of the present invention will be explained in more detail in the following with reference to the accompanying drawing. In the drawing,

DETAILED DESCRIPTION OF THE INVENTION

Figure 1:
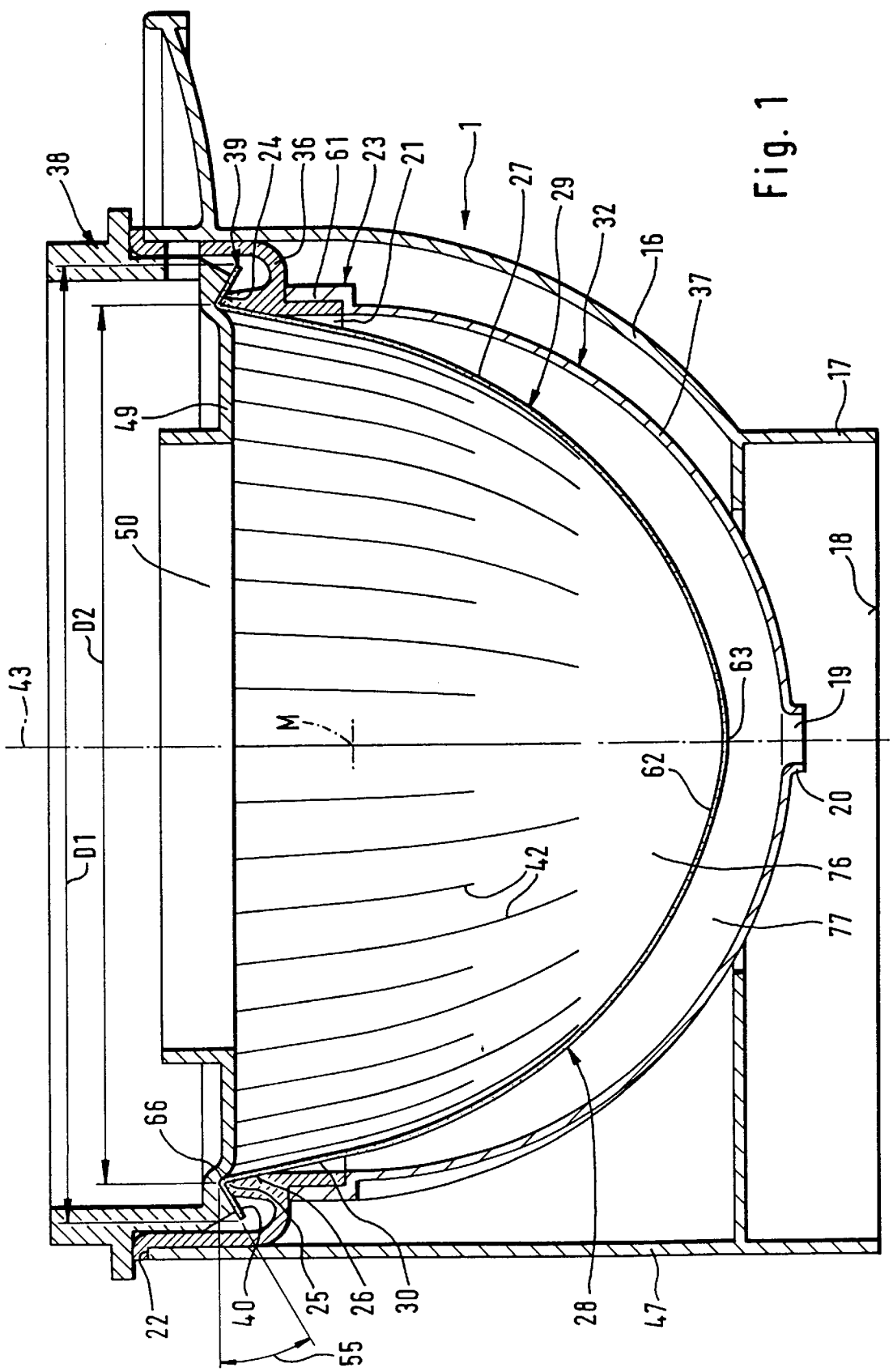
FIG. 1 is a longitudinal sectional view of a first embodiment of a filter housing, with filter element and retainer inserted therein and the pleats of the filter element closed.
Figure 11:
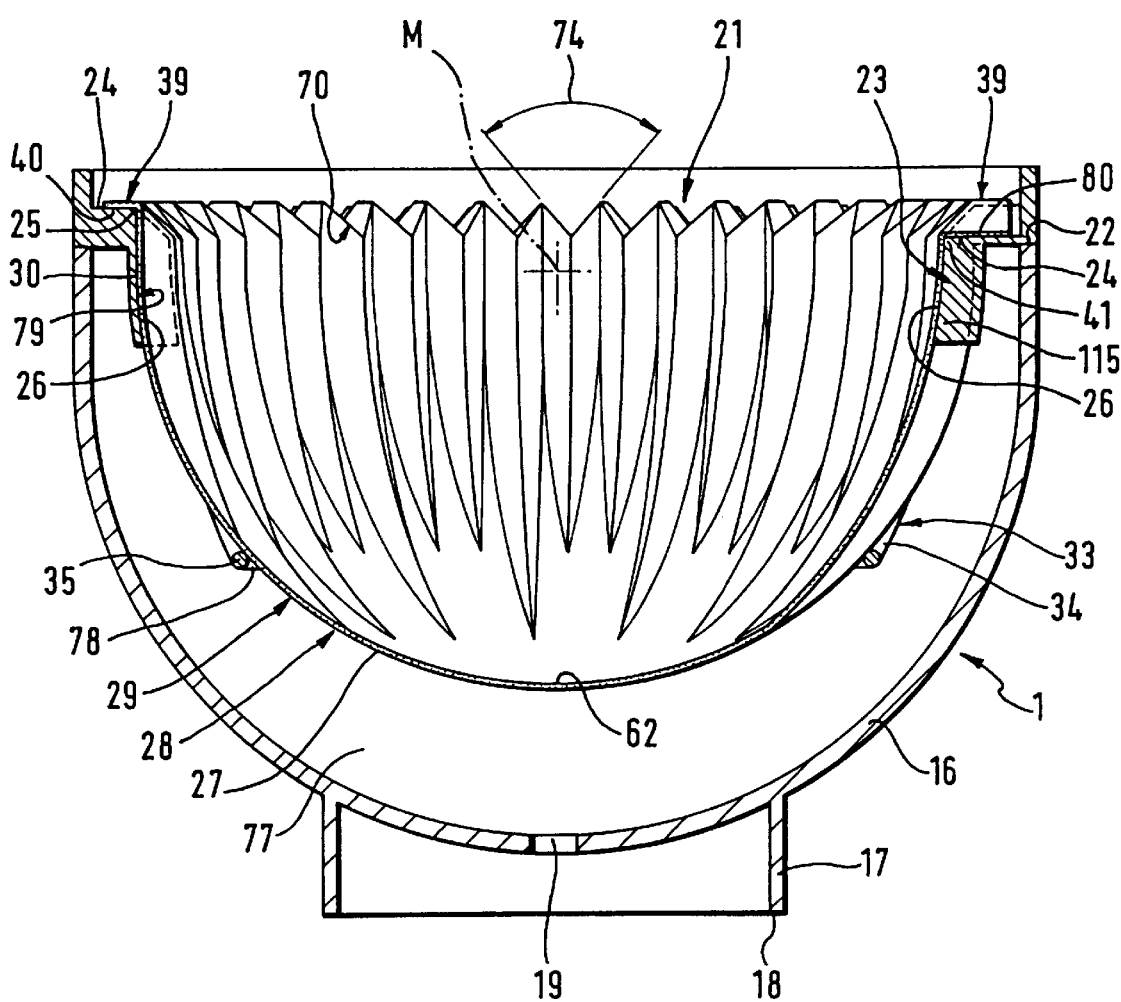
FIG. 11 is a longitudinal sectional view of a second embodiment of a filter support, with support ring and with the filter element suspended therein and provided with exposed pleats as in the embodiment of FIG. 8.
Figure 12:
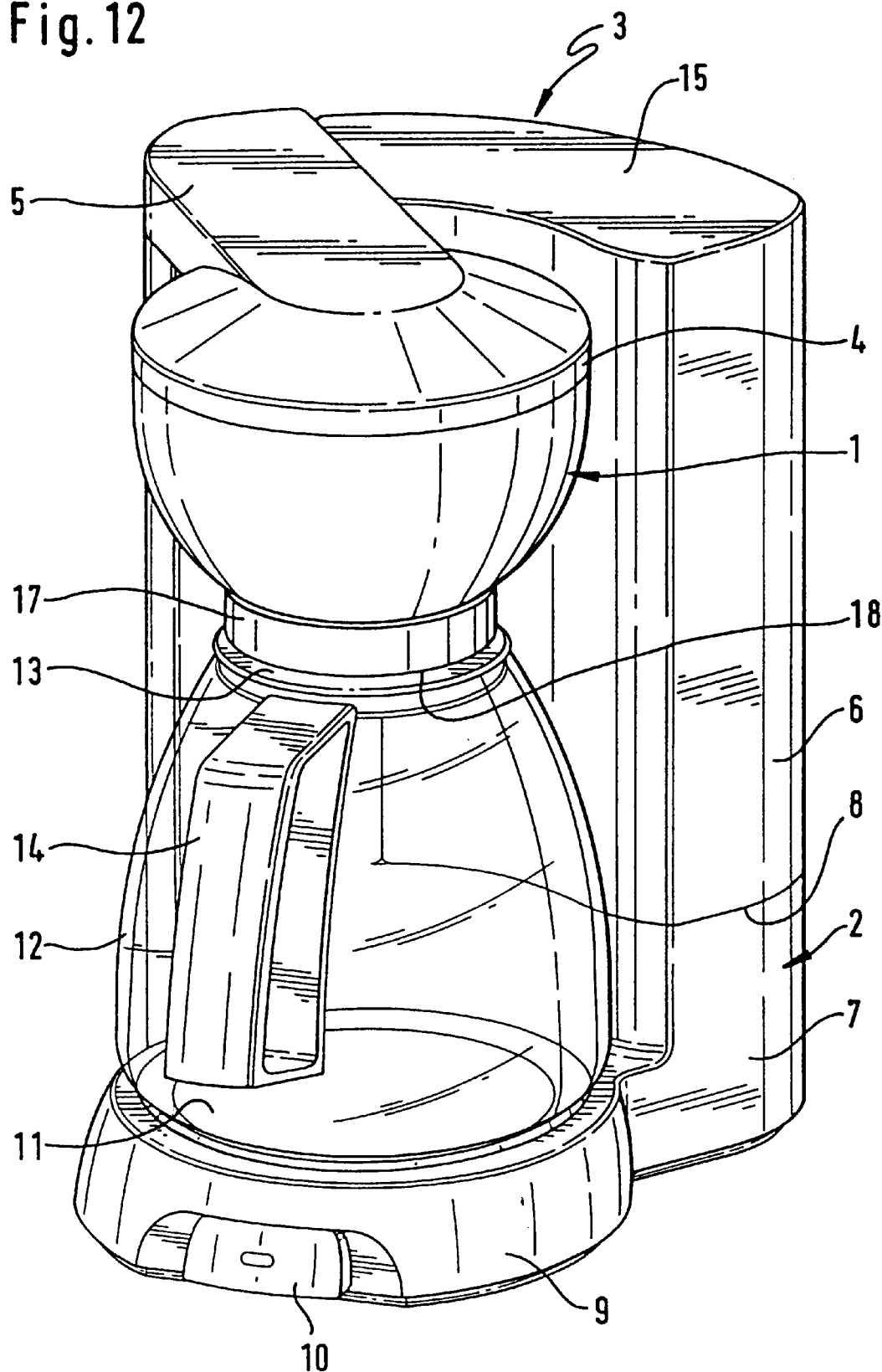
FIG. 12 is a perspective side view of a domestic coffee maker, with the filter support shown in FIG. 11 in longitudinal section in closed position, but on a reduced scale.

FIGS. 1, 11 and 12 show a filter support 1 which according to FIG. 12 is insertable into a housing 2 of a coffee maker 3 for domestic use and is carried by the housing. According to FIG. 12, a brewing head 4 fixedly connected to the housing 2 by means of an arm 5 is provided above the filter support. Adjoining the arm 5 laterally is a water reservoir 6 which sits on a base 7 of the housing 2. The transition from the base 7 to the water reservoir 6 is indicated by the horizontally extending parting line 8. Extending from the base 7 in forward direction is a plate-shaped rest 9 having at its front a rocker switch or a slide control 10 connected to an electric switching device mounted inside the rest 9 but not shown here in greater detail. The rest 9 has its upper side bounded by a warming plate 11 on which a vessel 12, preferably a glass carafe, is sat. The upper side of the glass carafe 12 terminates with a lid 13 fitted onto the glass carafe 12. A handle 14 is affixed to the outer circumference of the glass carafe 12, preferably by adhesive bonding.

Formed in the rest 9 beneath the warming plate 11 of FIG. 12 is an electric through-flow heater, not shown in more detail, whose inlet pipe is connected to the water reservoir 6 through a conduit not illustrated in greater detail. The outlet of the through-flow heater is connected to the brewing head 4 through a riser, not shown in more detail, which also extends within the arm 5. The water reservoir 6 is closable with a lid 15.

According to FIGS. 1, 11 and 12, the filter support 1 is comprised of a filter housing 16 preferably injection molded from a plastic material and of a substantially hemispherical or ellipsoidal cross section. Provided in the lower area and extending concentrically with the filter housing 16 is a tubular skirt 17 terminating with its end surface 18 a small distance from the top of the lid 13 according to FIG. 12. At the deepest point of the ellipsoidal filter housing 16 of FIGS. 1 and 11 is a central discharge orifice 19 which according to FIG. 1 is preferably provided with an annular collar 20 for improved discharge of the brewed beverages. The skirt 17 serves to improve the thermal insulation of the brew as it exits the discharge orifice 19. According to FIG. 12, the brewing head 4 closes the mouth 21 of the filter support 1 completely in order to avoid heat losses during the brewing cycle.

According to FIGS. 1 and 11, a support ring 23 rests on the rim 22 of the filter housing 16, the ring combining with the filter housing 16 to form the filter support 1 proper. The support ring 23 may also be integrally formed with the filter housing 16. For better cleaning results, it is however advisable to configure the filter housing 16 and the support ring 23 in two parts. A further embodiment of a support ring 23 is illustrated in FIGS. 6 and 7.

Figure 5:
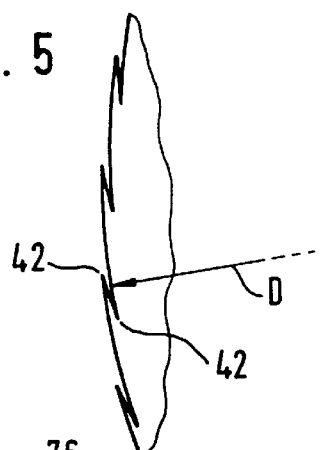
FIG. 5 is a partial cross-sectional view of the filter element in its transition area, taken along the line V—V of FIG. 3, but on an enlarged scale.
Figure 6:
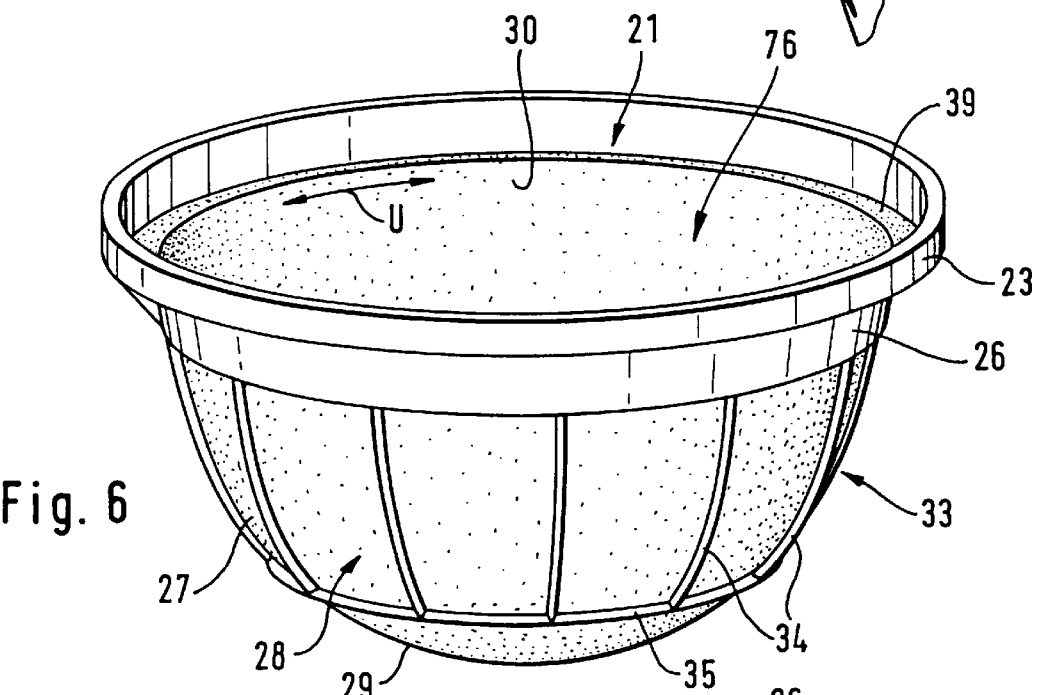
FIG. 6 is a perspective view of a second embodiment of a support ring of a filter support and a filter element inserted therein having its pleats pressed in relative opposition (not shown), the illustration differing from FIG. 1 in that adjoining the filter support in downward direction is an open basket and that the supporting surface extends horizontally.
Figure 7:
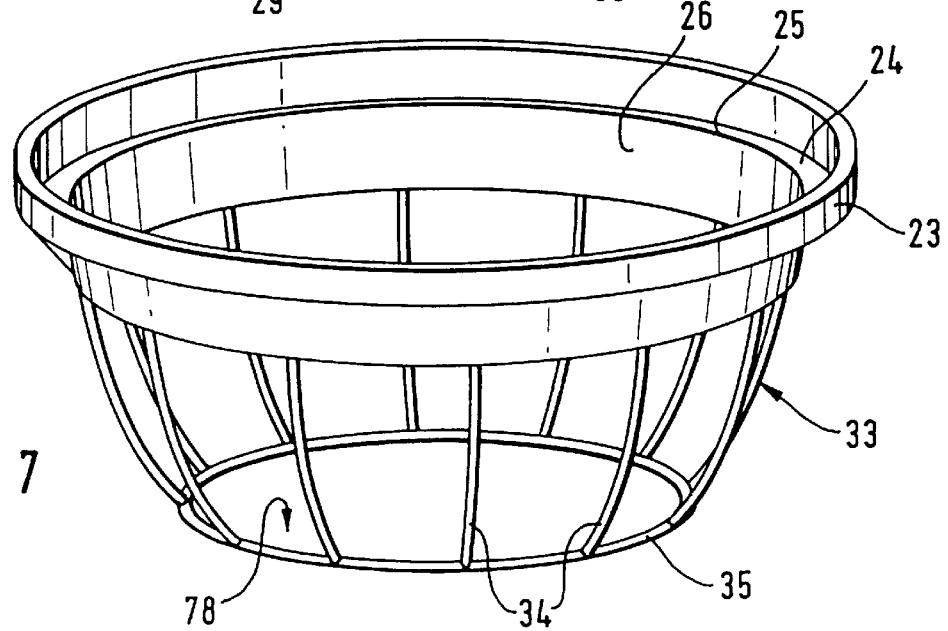
FIG. 7 is a perspective view of the support ring of FIG. 6, but shown without filter element.

According to FIGS. 1, 6, 7 and 11, the support ring 23 itself or the ring member 36 of the support ring 23 has a supporting surface 24 which in FIGS. 6, 7 and 11 extends substantially horizontally and radially outwardly, while in FIG. 1 it is of a substantially outwardly sloping configuration, that is, it extends conically downwardly. At its inner edge the supporting surface 24 forms a relatively sharp edge 25 (with a very small radius at most) continuing downwardly in a transition area 26. The edge 25 is of a ring-shaped configuration as is the supporting surface 24. The wall of the transition area 26 is conformed to the outer envelope 29 of the outer wall 27 of the filter element 28 as shown in FIGS. 1 to 6, while the wall of the transition area 26 of the support ring 23 of FIG. 11 is conformed to the shape of the transition area 30 of the outer wall 27 of the filter element 28 (FIGS. 8 to 11) against which it bears likewise practically with its entire surface. The transition areas 26, 30 of FIGS. 1, 2, 3 and 7 have a smooth structure—apart from the paper's roughness—, while the transition areas 26, 30 of FIGS. 11, 8, 9 and 10 are of a zigzag-shaped configuration.

In FIG. 11 the support ring 23 is an integrally formed part whose lower transition area 26 is adjoined by a downwardly open basket 33, as becomes apparent from FIGS. 6 and 7. The basket 33 comprises relatively spaced downwardly extending braces 34 which all terminate in a horizontally extending ring 35 through the opening 78 of which the filter element 28 passes in downward direction (FIG. 11) so that the filter element 28 sits in the filter support 1 in substantially suspended fashion. The braces 34 essentially match the envelope 29 of the filter element 28, that is, in the area of the braces 34 and the ring 35 the filter element 28 of FIG. 11 is partly supported in both a radial and a vertical direction. The major share of the supporting function is, however, carried by the rim 39. The basket 33 provides for additional lateral securing of the filter element in the filter support 1.

While the support ring 23 of FIG. 11 is integrally formed, it is formed of two parts in FIG. 1, comprising an ellipsoidal portion 32 and an upwardly adjoining ring member 36. The portion 32 and the ring member 36 may be joined together at 61 by adhesive bonding, welding, threading, snap-fitting or similar fastening means. The ellipsoidal portion 32 of FIG. 1 is formed by a wall enclosure 37 extending at a distance to the filter housing 16. With the double-walled construction of the filter support 1, a particularly thermally protected filter support unit 1 is obtained. According to FIGS. 1 and 11, the support ring 23 enables this unit to be withdrawn from the coffee maker 3 without removing the filter support 1, however, in FIG. 1 the closed ellipsoidal portion 32 provides for better protection of the filter element 28 than it does in the open configuration of FIG. 11. In FIG. 1 the ring member 36 bears against the filter support 1 through the rim 22.

In FIGS. 1, 6 and 11 the filter element 28 made of thin filter paper is inserted into the mouth 21 of the support ring 23 of the filter support 1, which filter element essentially follows the contour of an ellipsoid and has its free end adjoined by a rim 39 extending radially outwardly and advantageously formed by an annular collar. It will be understood that the rim 39 may also be composed of individual sections. The bearing surface 40 formed on the underside of the rim 39 of the filter element 28 is practically in perfect registry with the supporting surface 24 of the filter support 1 unless the filter element 28 has minor deformations due to its relatively large flexibility. These deformations may however be eliminated using manual pressure against the bottom 62 once the filter element 28 is inserted.

The ring-shaped rim 39 of the filter element 28—conforming to the contour at the junction of the supporting surface 24 with the transition area 26 of the filter support 1—has a relatively sharp corner 41 in order to improve the transmission of the weight load of the filter element 28 to the rim 39 and thus achieve a stable position of the filter element 28 in the filter support 1 also in wet condition.

Figure 2:
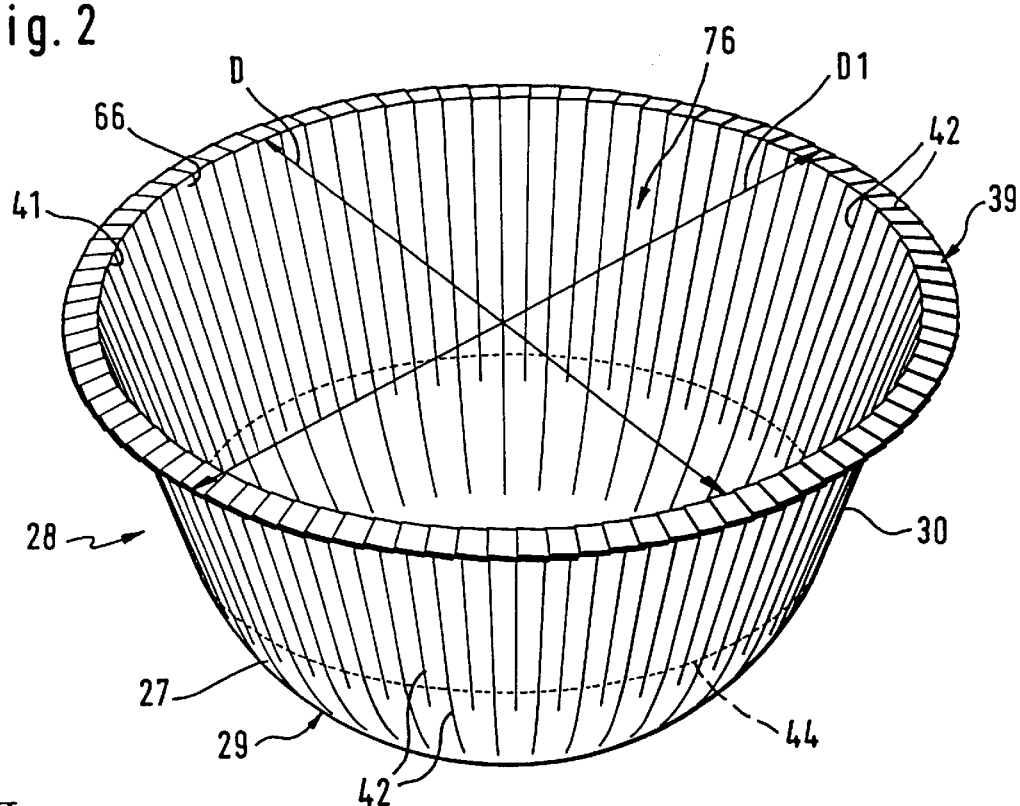
FIG. 2 is a perspective view of the filter element inserted in the filter housing of FIG. 1.
Figure 3:
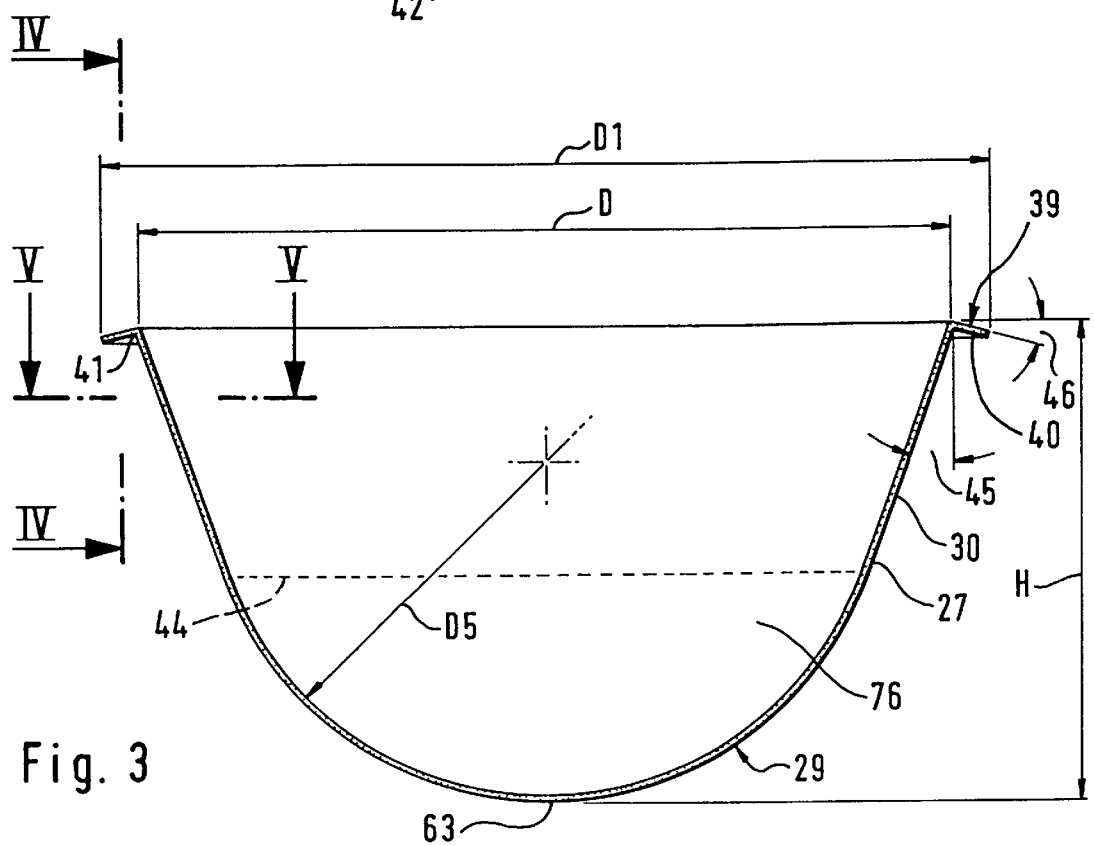
FIG. 3 is a longitudinal sectional view of the filter element of FIG. 2.
Figure 4:
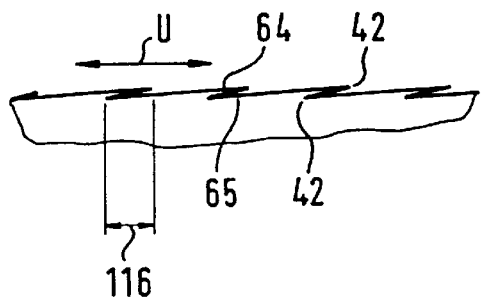
FIG. 4 is a partial cross-sectional view of the filter paper substantially perpendicular to the rim, taken along the line IV—IV of FIG. 3, but on an enlarged scale.

According to FIGS. 1 to 6, the filter element 28 is comprised of overlapping pleats 42 which, as shown clearly in particular in FIGS. 1 and 2, extend parallel to the longitudinal direction of the center line 43, that is, radially towards the lowermost point 63 lying on the center line 43 of the filter element 28, of the outer wall 27 of the filter element 28. In the cross-sectional views of FIGS. 4 and 5, the pleats 42 extend in a substantially Z-shaped configuration, with the upper side 64 and the underside 65 (FIG. 4), and the outer side 66 and the inner side 67 (FIG. 5) extending substantially in the circumferential direction U in superposed (FIG. 4) and, respectively, juxtaposed (FIG. 5) arrangement, so that an area of overlap 116 results. In FIGS. 4 and 5, the pleats 42 are not perfectly closed, so that a very narrow gap remains which, however, in the extreme case when the pleats are very firmly pressed on, may even be closed in dry condition.

As becomes apparent from FIGS. 2 and 3, the filter element 28 extends frusto-conically in the transition area 30, whilst continuing in a substantially hemispherical configuration from the parting line 44 downwards. The angle 45 of the truncated cone in the transition area 30 amounts to about 15° at a diameter D of about 115 mm in the mouth area. The angle 45 may also be smaller than 15 °. However, it invariably needs to be greater than 0° in order to obtain a bevel which is necessary to enable the filter element 28 to be withdrawn from the forming die. The same applies when the filter element is removed from a stack. The height H of the filter element 28 is 75 mm, approximately. As becomes apparent from FIG. 3, the rim 39 extends outwardly, sloping at the same time downwardly while enclosing an angle 46 of about 5°. Corresponding dimensions in these areas apply equally to the lowermost areas 80 of the supporting surface 24 of the V-shaped grooves 79 on the filter support 1 according to FIGS. 1, 6, 7, 11 and 12, and to the filter elements 28 of FIGS. 1, 2, 6, 8, 9, 10 and 11 as well. To make sure that the filter element 28 rests at all times snugly against the transition area 26, the diameter D is preferably selected so as to be some millimeters wider. On insertion into the filter support 1, the filter element 28 is thus always compressed under radial bias and hence prevented from slipping through.

According to FIG. 1 a retaining device 38 is placed down onto the mouth 21 of the filter support 1, resting with its own weight on the upper side of the rim 39 for holding the filter element 28 in place and locating itself centrally by means of the inner edge 66 of the filter element 28. To enable the filter element 28 to be removed from, and inserted into, the filter support 1, it is however also possible to provide for pivotal movement of the retaining device 38 using suitable pivot elements (not shown) such as hinges, and for securing the filter element 28 the retaining device can be urged against the supporting surface 24 of the filter support 1 or ring member 36 using suitable fastening elements such as clips, snap-fit connectors, etc. To avoid heat losses, the retaining device 38 is provided with a cover 49 having a central opening 50 for the inflow of hot water. The retaining device 38 operates to hold the filter element 28 clamped between it and the support ring 23 or the filter support 1.

According to FIG. 1 a wall 47 projects from the left area of the filter support 1, which wall serves to mount the filter support 1 in the coffee maker 3 of FIG. 12. The wall 47 merges into an ellipsoidal shape on the circumference of the filter support 1 and continues to be ellipsoidal in FIG. 1 on the right hand side of the filter support 1 of FIG. 1.

Figure 8:
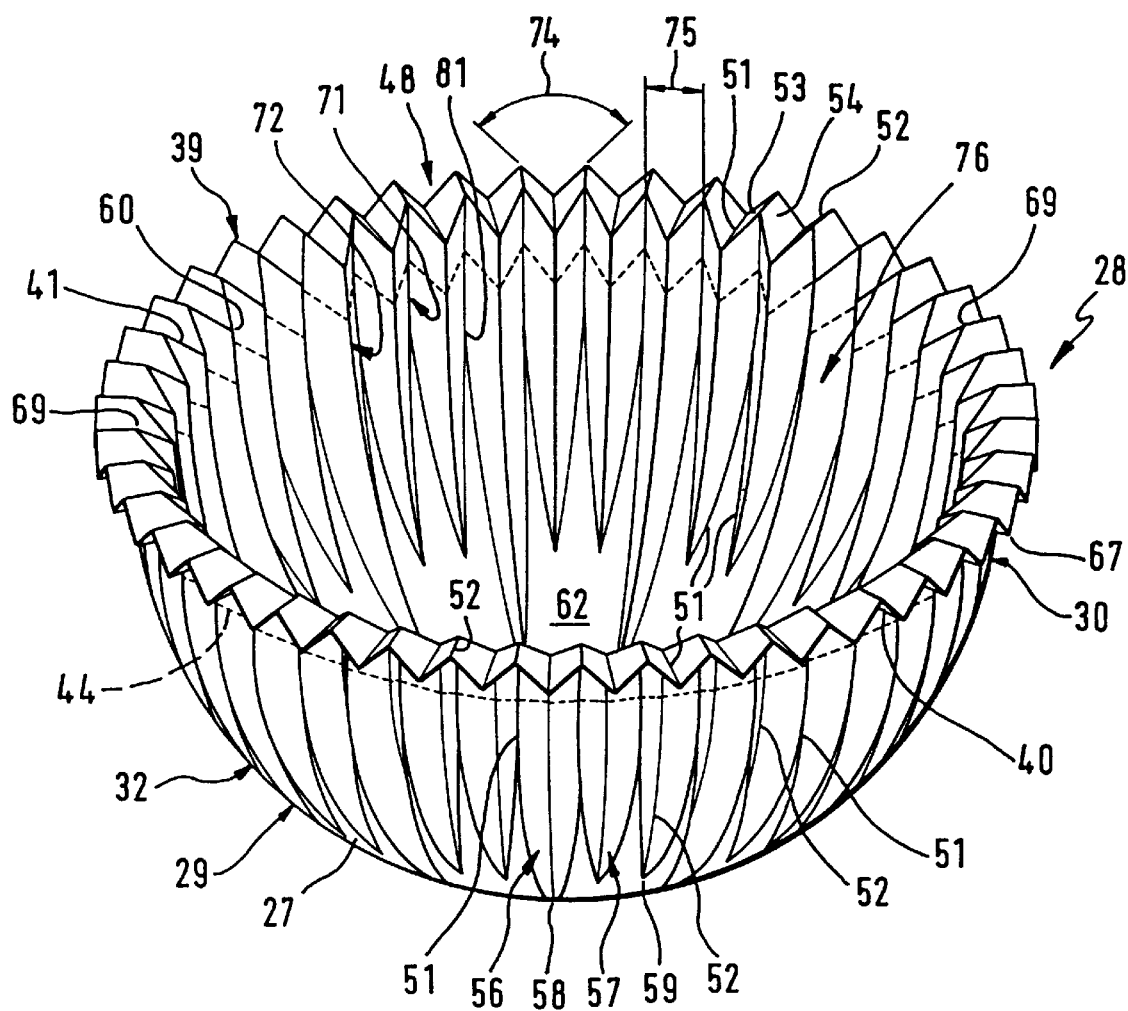
FIG. 8 is a perspective view of a second embodiment of a filter element having exposed pleats in both the rim and the transition areas.
Figure 9:
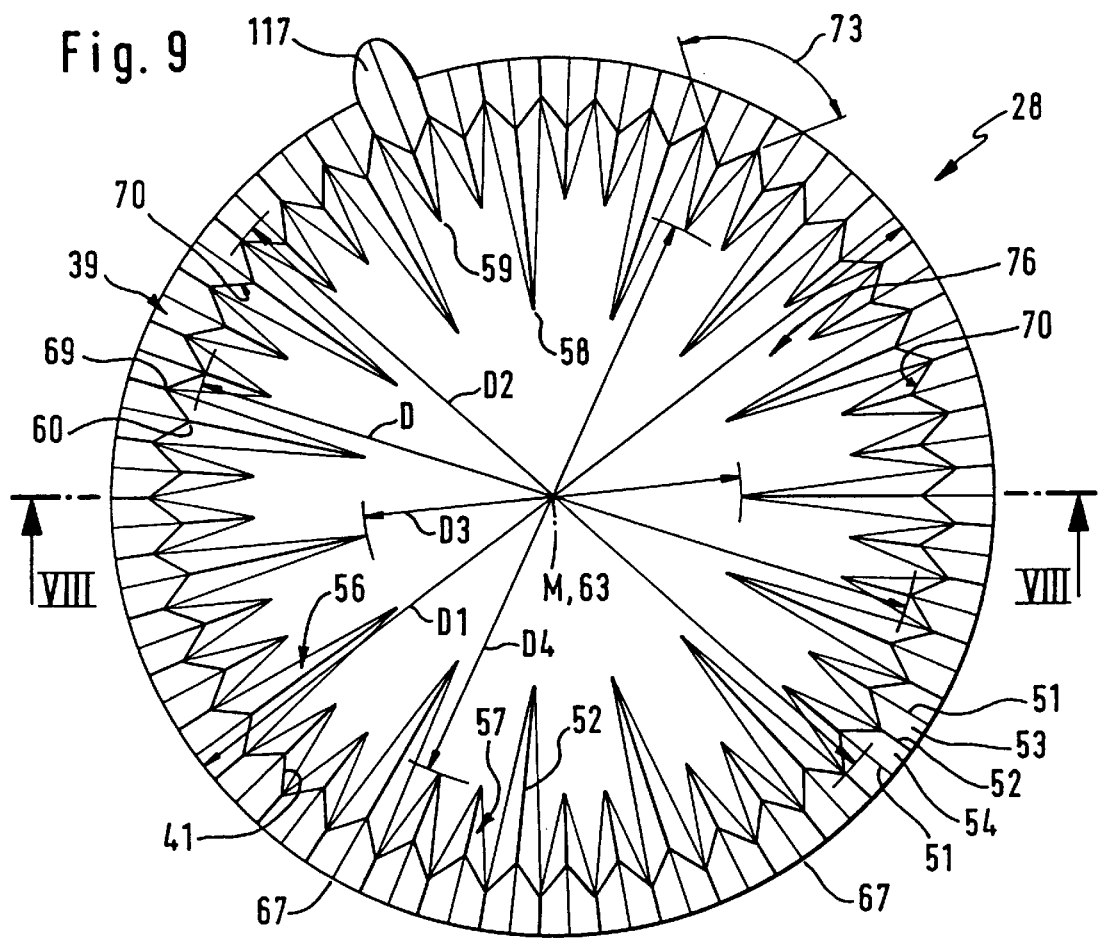
FIG. 9 is a top plan view of the filter element of FIG. 8.

In FIGS. 8 to 11 a filter element 28 is shown which, in contrast to the filter element 28 of FIGS. 1 to 6, has exposed pleats 48 in upward direction (rim 39) and in radially outward direction (transition area 30). Exposed pleats as used herein means that the pleats have no undercuts—in contrast to the overlapping pleats 42 as in FIGS. 4 and 5—, that is, when looking down into the receiving cavity 76 of the filter element 28 as shown in FIG. 9, the visible surface of the filter paper can be seen without undercuts looking from above.

According to FIGS. 8 to 11, the exposed pleats 48 are formed by trough pleats 51 and crest pleats 52. As appears from FIG. 9, the trough and crest pleats 51, 52 are oriented in the direction of the lowermost point 63. Each two adjacent crest pleats 52 combine with a trough pleat 51 to form an exposed pleat 48 which in cross section in the direction of the center line 43 widens in V-shape from its beginning in upward direction (FIG. 10) and has the side walls 53, 54 as its boundaries. Trough pleats 51 are understood to mean those pleats which when looking down into the receiving cavity 76 are recognizable as recesses or notches 71. When viewing these notches 71 of FIGS. 8 and 10 from below or from outside and from below, this notch 71 presents itself reversed, that is, as a crest pleat 52 in the form of a gable roof like elevation 72. By analogy, the same applies to the gable roof like elevations 72. Hence it always depends on the position from which a person views the filter element 28, looking either into the inside of the receiving cavity 76 or at the outer wall 27 from outside. Accordingly, when a trough pleat 51 or a crest pleat 52 is mentioned in connection with the subject matter of this application, invariably those pleats are meant that present themselves to the viewer when looking at the interior of the receiving cavity 76.

Figure 10:
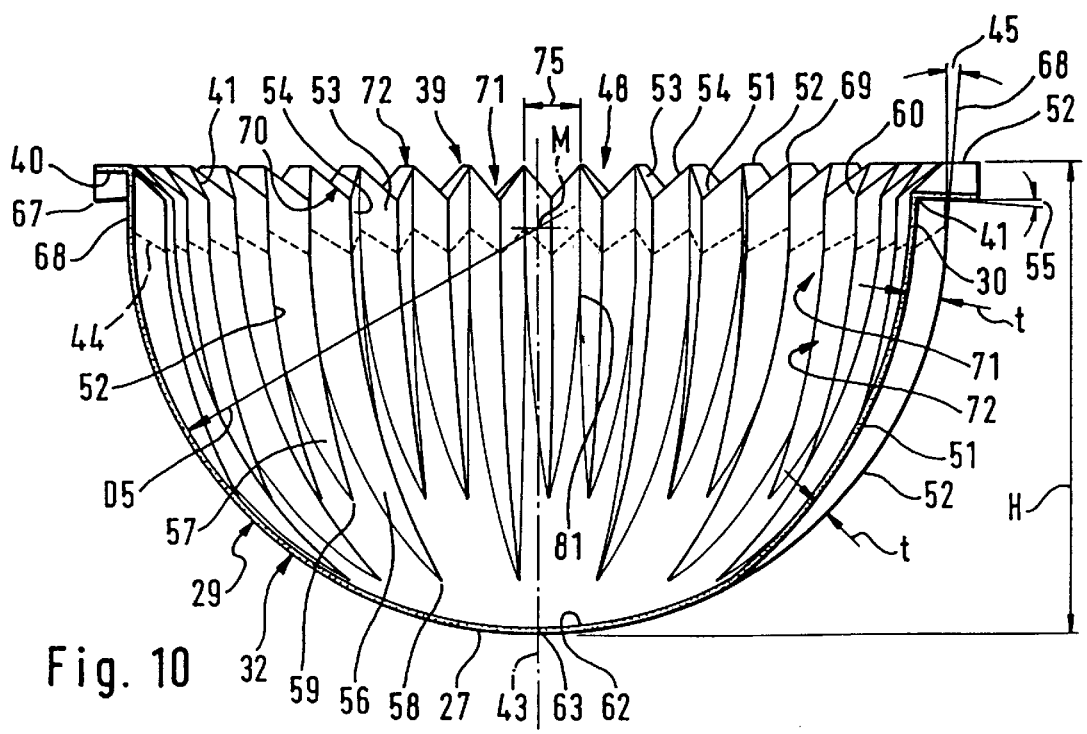
FIG. 10 is a longitudinal sectional view taken along the line VIII—VIII of FIG. 9.

As becomes apparent from FIGS. 8 and 10, the crest pleats 52 start from points 69 as a line splitting into two pleats at points 81. This is so because the displacement of paper material diminishes towards the lowermost point 63, that is, in this area the pleats 51 merge with the outer wall 27 of the ellipsoidal portion 32. The crest pleat 52 on rim 39 turns into a trough pleat 51 at point 69, extending as such down to point 81.

As appears from FIGS. 8 and 9, the pleats 48 formed on the rim 39 are all of like geometry, that is, all the outer peaks 67 of the trough pleats 51 lie on a common horizontal plane when the peaks 67 are connected with each other. Because the trough pleats 51 have a downward inclination with an angle 55 of about 2° from outside to inside, they are at a horizontal level when imaginary concentric rings are laid about the center line 43, striking the rim 39. The angle 55 results from the horizontally extending crest pleat 52 and the geometric configuration of the exposed pleats 48, provided that circular blanks are selected as filter paper which are then pleated and formed to produce the filter element 28 illustrated in FIGS. 8 to 10. As becomes apparent from FIG. 9, the outside diameter D1 of the rim 39 of the formed, that is finished, filter element amounts to about 130 mm, the hemispherical cavity (ellipsoidal portion 32) bounded by the envelope 29 then having a diameter D5 of about 105 mm. The envelope 29 is defined as an imaginary surface area which results when a very thin membrane is stretched over the crest pleats 52 and over the lowermost point 63.

According to FIGS. 8 and 10, a transition area 30 extending upwardly from the parting line 44 adjoins the hemispherical area of the outer wall 27 of the filter element 28. In this embodiment, both the trough pleats 51 and the crest pleats 52 extend from the parting line 44 in upward direction at an angle 45 of about 8° slightly conically outwardly, which is however not clearly recognizable in the drawing. This bevel 68 serves to aid in the removal of the filter element 28 from the die following the forming operation.

According to FIGS. 8 to 10, long and short pleats 56 and 57, respectively, are arranged on the filter element 28, which pleats are spaced uniformly apart on the circumference and are all oriented towards the lowermost point 63. Between each two long pleats 56 there are two short pleats 57. In FIG. 9 the pointed ends 58 of the long pleats 56 lie on a common diameter D3 of about 57 mm. Equally, the pointed ends 59 of the short pleats 57 lie on a common diameter D4 of about 87 mm.

As becomes apparent from FIGS. 8 and 10, a trough pleat 51 formed in the rim 39 changes into a crest pleat 52 at the sharp corner 41 towards the transition area 30, extending from this point downwards to the diameters D3 (long pleat 56) and D4 (short pleat 57) of the ellipsoidal portion 32. The transition from a trough pleat 51 to a crest pleat 52 is represented by point 60, while the transition from a crest pleat 52 to a trough pleat 51 is represented by point 69. The points 60 lie on a diameter D of about 110 mm, while the points 69 lie on a diameter D2 of 120 mm. Serving as a handle for the filter element 28, a tab 117 projects outwardly from the rim 39 to facilitate the removal of a filter element 28 from the stack.

To be able to provide an ellipsoidal portion 32 with a radially outwardly extending rim 39 without any additional means and without the formation of overlapping pleats, it is absolutely necessary according to the present invention to make provision for a reversal of an inwardly pointing crest pleat 52, that extends from the transition area 30, into a trough pleat 51 at point 60, meaning that a notch (trough) 71 changes into a roof-shaped elevation 72 at the transition line 70. It is only in this manner that exposed pleats 48 can be represented on a hollow spherical filter element 28 with rim 39, the pleats continuing from a concave outer wall 27 in a radially outwardly extending rim 39.

In order to be able to better displace the paper material which, for forming the filter element 28, is a round filter paper blank (not shown) of a diameter of about 225 mm without complicating manufacture, two short pleats 57 are formed between each two long pleats 56. It would be conceivable, of course, to use pleats of equal length throughout instead of the two short pleats 57, but then a different flank angle 73 would have to be selected in order to achieve the same paper displacement as with the formation of two pleats 59. The flank angle 73 in a short or long pleat 57, 56 is about 67.5°, but this angle results automatically with the number of pleats spaced uniformly on the circumference of the filter element 28 at given diameters D1 and D2, as does the pleat angle 74 on the rim 39.

According to FIG. 10, the short and long pleats 57, 56 do not increase linearly in depth 74 and width 75. Linearly increasing pleats are known in the art from cup-shaped filter elements in which the side wall rising from the circular bottom forms a truncated cone. When it is desired to obtain an ellipsoidal or hemispherical shape of the filter element 28 as is the case in the present invention, the pleats 48 are required to fold away the filter material such that, when developed, a plane results, while when formed to filter shape, an ellipsoidal or hemispherical form is obtained.

According to FIGS. 1, 11 and 12, the mode of operation of the filter unit of the present invention which is comprised of a filter element 28 inserted into a filter support 1 is as follows:

From a stack of filter elements 28 or filter bags—a stack being understood to mean several nesting filter elements 28 which are however not illustrated in the drawing—a single filter element 28 is removed and inserted into the filter support 1. According to FIG. 12, this operation is preceded by the filter support 1 being pulled forwardly out of the housing 2 of the coffee maker 3 or swung open to the side to have free access to the mouth 21 of the support ring 23 or the filter support 1 from above. Then the filter element 28 is inserted through the mouth 21 into the support ring 23 or the filter support 1 until its rim 39 rests snugly against the supporting surface 24. In this process, the outer wall 27 of the filter element 28 is elastically compressed radially inwardly by the transition area 26 of the support ring 23, causing the trough pleats 51 to rest with a small bias against the transition area 26 of the filter support 1 or the support ring 23, thus preventing the filter element 28 from virtually falling through the mouth 21 on insertion, until it finally has its rim 39 in engagement with the supporting surface 24. The radial constriction on the filter element 28 is taken up particularly elastically by the V-shaped trough and crest pleats 51, 52 extending upwardly and radially outwardly, enabling the filter element 28 to be inserted into the filter support 1 with great ease and little effort.

If the rim 39 of the filter element 28 is yet short of its uniform engagement with the supporting surface 24 on insertion into the filter support 1, an operator may use his or her hand to press down on the bottom 62 in the area of the lowermost point 63 to properly locate the filter element 28 centrally in the filter support 1 and cause the rim 39 to rest snugly on the supporting surface 24; this is in particular so because the surface of the supporting surface 24 and the surface of the transition area 30 have the same contour as the filter element 28 in the area of the contacting surfaces. As the filter element 28 of FIGS. 8 to 11 is inserted, the filter element 28 turns until the trough pleats 51 engage within the registering grooves 79 and elevations 115 on the support ring 23 and are centrally located in position.

The elastic action of the filter element 28 of FIG. 2 is however not as good as in the filter element 28 of FIGS. 9 to 11 because of the presence of overlapping pleats rather than exposed pleats 48 on the filter element. The stiffness is however greater. According to FIG. 1, upon insertion of the filter element 28 the ring member 36 is subsequently placed down onto the rim 39 of the filter element to urge the rim 39 of the filter element relatively firmly against the supporting surface 24 of the ring member 36.

Preferably then, ground coffee (not shown) is filled in. Subsequently, the filter support 1 is moved into the closed position shown in FIG. 12 in which the brewing head 4 closes the mouth 21 from above and the conduit (not shown) from the through-flow heater is positioned above the mouth 21 of the filter element 28. When hot water is poured over the coffee grounds by hand or, according to FIG. 12, when the through-flow heater (not shown) is activated by means of the switch 10 causing hot water to enter the mouth 21 via the arm 5 and the brewing head 4, this hot water will penetrate the coffee grounds, extracting extractable substances from the material being extracted. By reason of the nearly equal distance between the center M (designating roughly the area which results when water enters and a mean liquid level is present with the coffee grounds filled in to medium up to full capacity on the one hand, and on the other hand the area of the filter element 28 from which the radial distance to the wall of the filter element 28 is approximately equal) and the outer wall 27 of the filter element 28, the beverage thus brewed is drained freely and uniformly along the outer wall 27 without encountering any appreciable impediment by parts of the filter support 1.

Due to capillary action, humidity travels also up to the rim 39 of the filter element 28, forming a liquid layer between the bearing surface 40 and the supporting surface 24. This thin liquid layer contributes to ensure that the filter paper of the filter element 28, which meanwhile has become very limp, is retained on the supporting surface 24 with its rim 39 and particularly also in the transition area 26, which effect enhances the supporting function. Although the filter element, once wetted, loses its stiffness nearly completely, its hemispherical shape is nevertheless substantially maintained, and the filter element 28 does not collapse radially which in FIGS. 1 and 11 would entail sinking of the filter element 28 down into the receiving cavity 77 of the filter housing 16.

According to the embodiment of FIG. 11, the braces 34 of the basket 33 provide for an additional improvement of the position of the filter element 28 in the filter support 1. In this embodiment, the braces 34 serve to hold the filter element 28 radially, in addition to securing the filter element against falling out of the opening 78 of the ring member 36 due to its own weight. Supporting the filter element 28 solely through its rim 39 is however entirely sufficient.

As becomes apparent from FIG. 11, it should be mentioned further that both the transition area 26 of the support ring 23 and the supporting surface 24 are configured such as to match the outer contour of the filter element 28, being accordingly provided with V-shaped grooves 79 and elevations 115 engaged by the trough pleats 51 of the filter element. The side walls 53, 54 engage the wall surfaces of the grooves 79 and elevations 115, on which side walls 53, 54 they are held due to the effect of adhesion.

According to FIGS. 1 and 11, the brewed beverage is drained along the outer wall 27 of the filter element 28 nearly uniformly after the extractable substances are extracted evenly from all areas of the material being extracted. As soon as the brewed beverage has reached the lowermost point 63 of the filter element 28, it leaves the filter element 28 and flows into the receiving cavity 77 from where it exits the filter support 1 through the orifice 19, entering a glass carafe 12 placed underneath. Once the extraction cycle is completed and the extract is discharged from the filter element 28, the brewing cycle is completed. The ellipsoidal shape of the filter element 28 also obviates prolonged dripping so that dripping stops as early as after about four drops.

Then the filter support 1 of FIGS. 1 and 11 can be removed again from the housing 2, and the filter element 28 together with the coffee cake (not shown) can be discarded by turning the filter support 1 upside down. However it is also conceivable to remove only the support ring 23 with the filter element 28 sitting therein by means of a handhold formed on the support ring 23 but not shown in the drawing, and to remove the filter element 28 by turning it upside down (FIG. 11). According to FIG. 1 this first requires the retaining device 38 to be swung open or otherwise removed from the ring member 36 or the filter support 1.

With the filter element 28 of the present invention which is fabricated from very thin filter paper, preferably of a thickness of only 0.1 mm, a filter paper shape is provided which, for the first time, continues to be quite stable also in wet condition, the filter element 28 being held in the filter support 1 without elaborate holding means. The stable filter paper shape makes handling a simple matter and allows excellent brewing results due to its ellipsoidal form. With this filter element 28 particularly, the brewed beverage can be drained along the outer surface nearly without any hindrance, which reduces the period of time during which the hot water is held in the filter element 28, thus preventing undesirable flavors or aromatics from being introduced, in addition to preventing the brewed beverage from cooling too rapidly.

FIGS. 13 to 17 illustrate the individual process steps for manufacturing one or several filter elements 28 (FIGS. 1 to 11) by means of a die assembly 92. In this process, the die assembly 92 comprises a punch half 82, a die half 83, a blankholder 84 and a retainer 89 serving as locating means. The die half 83 has an ellipsoidal cavity 97 whose inner wall is either smooth or has V-shaped notches 96. Where the inner wall 98 is smooth, a filter element 28 according to FIGS. 1 to 6 is obtained, whilst in the case of an inner wall 98 having V-shaped notches 96, a filter element 28 of the type illustrated in FIGS. 8 to 11 is produced. Obviously then, the surface of the punch half 82 has to be smooth (filter element 28 of FIGS. 1 to 6) or it has to be provided with V-shaped elevations 95 (filter element 28 of FIGS. 8 to 11) suitable for engagement in the mating V-shaped notches 96 in the die half 83.

Figure 15:
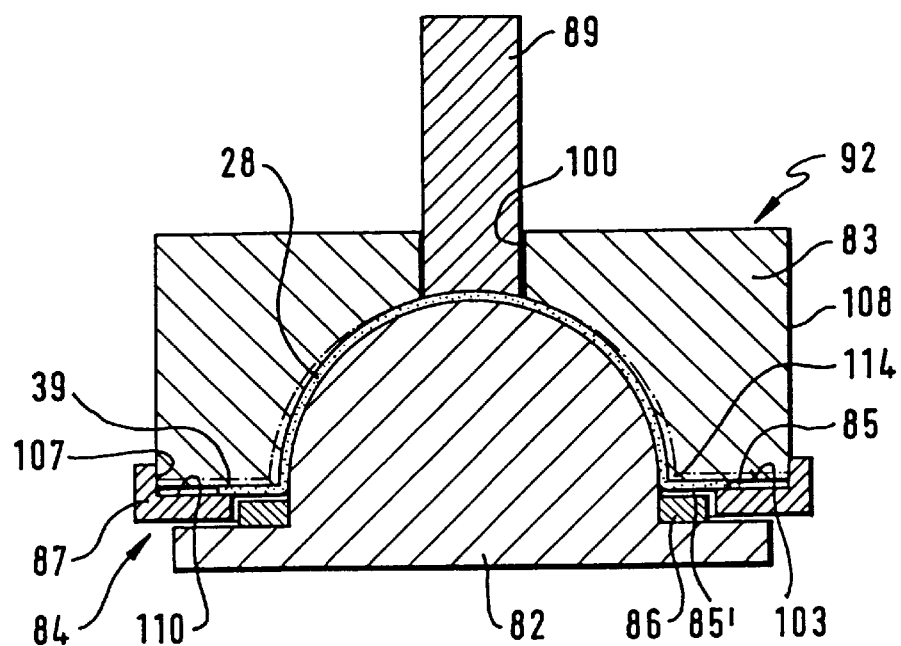
Figure 16:
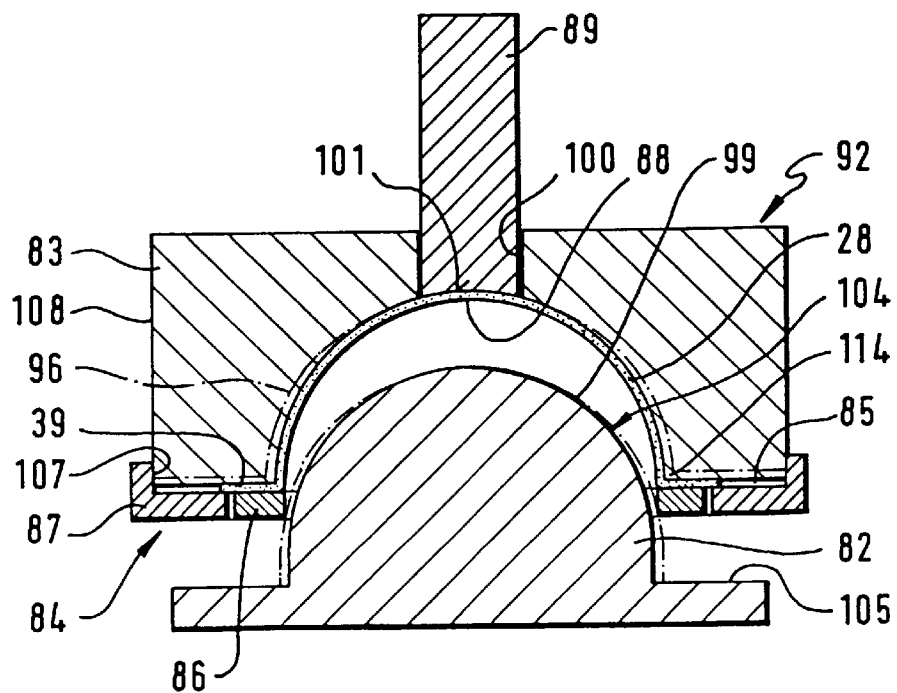

According to FIGS. 13 to 17, a bore 100 is formed in the center of the die half 83, through which bore the retainer 89 configured as locating means extends. According to FIGS. 15 and 16, the inner surface 101 on the retainer 89 combines with the inner wall 98 of the die half 83 to form an enclosed ellipsoidal cavity 97 which is present, for example, when the filter element 28 is formed to its final shape or when the die half 83, together with the retainer 89, is on its upward travel or has completed its upward travel (FIG. 16). Equally, the inner surface 101 of the retainer 89 is either smooth or provided with V-shaped notches 96 registering with the elevations 95 on the punch half 82. The die half 83 is displaceable relative to the retainer 89 in the longitudinal direction of the central axis 102. The retainer 89 is vertically displaceable relative to the die half 83 equally in the direction of the central axis 102. In addition, both the retainer 89 and the die half 83 are movable up and down simultaneously. According to FIG. 13, the end of the inner wall 98 has an adjoining annular surface 103 which is likewise provided with the V-shaped notches 96 which extend normal to the central axis 102.

According to FIGS. 13 to 17, the punch half 82 is arranged vertically beneath the die half 83 and the retainer 89, which punch half is essentially comprised of an ellipsoidal hemisphere 104 extending centrally to the central axis 102. V-shaped elevations 95 are formed on the surface of the ellipsoidal hemisphere 104, said elevations extending such as to fill the space in the filter element's 28 notches 71 of FIGS. 8 to 10 on the one side, or the notches 96 in the die half 83 on the other side, when the punch half 82 and the die half 83 are in the closed position. Adjoining the lower end of the punch half 82 in radially outward direction is an annular shoulder 105 serving as a pressure device against the blankholder 84.

It should be noted in this connection that the die assembly 92 of FIGS. 13 to 17 is illustrated without the associated actuating and guiding devices and control elements for greater clarity of illustration of the forming operation proper.

Figure 13:
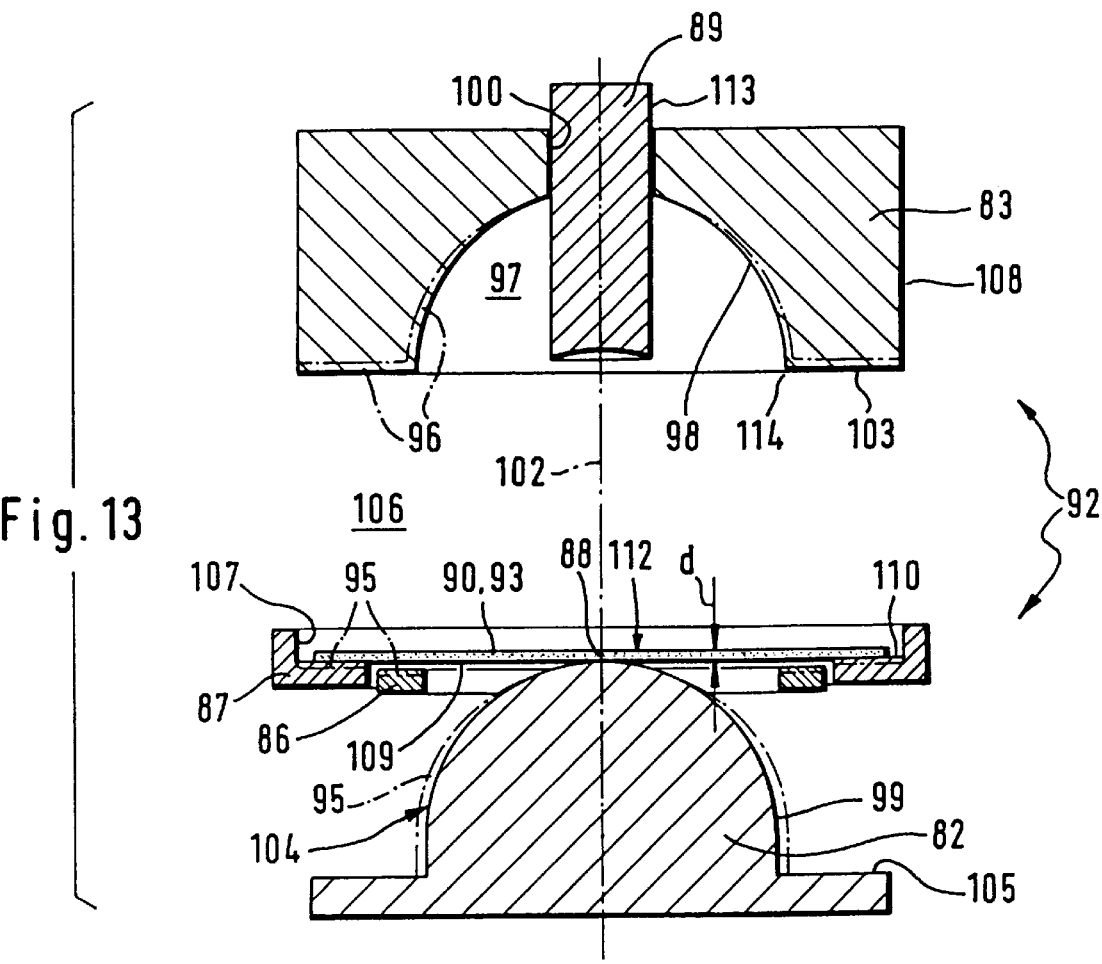
FIGS. 13 to 17 show individual process steps for the manufacture of the filter element of the present invention in a die assembly provided for this purpose, including die half, punch half, blankholder, filter element and locating means.
Figure 14:
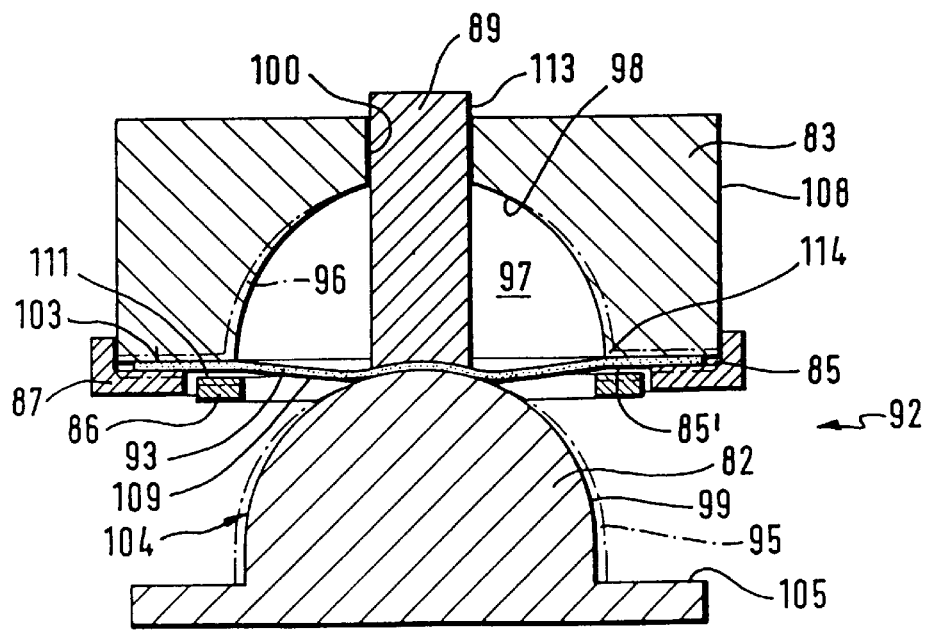

The mode of operation of the die assembly 92 of the present invention is as follows:

FIG. 13 shows the die assembly 92 in open position, that is, die half 83 and retainer 89 are in spaced relationship to and above the punch half 82, producing a clearance space 106 between the punch half 82 and the die half 83 with its retainer 89, which space enables a gripper, not shown, to load a round paper blank 93 or a stack 112 including several round paper blanks 93 from the side, placing it onto the upper side of the outer ring 87 of the blankholder 84. In the embodiment shown, the thickness d is intended to designate several round paper blanks 93 in superposed position.

As becomes apparent from the Figures, the outer ring 87 of the blankholder 84 has at its radially outer end an upwardly extending hollow cylindrical wall 107 which locates itself centrally on the outer wall 108 of the die half 83 when the outer ring 87 is urged against the die half 83. As appears from FIGS. 13 to 15, the underside 109 of the bottommost round blank 93 rests against the upper side 110 of the outer ring 87, while the upper side 111 of the inner ring 86 extends slightly beneath the upper side 110 of the outer ring 87, that is, a small clearance space 85 is formed between the inner ring 86 and the underside 109 of the last round paper blank 93. As this clearance space 85 may be vanishingly small, it is only intended to indicate that the inner ring 86 will not present an impediment to the filter paper stack 112 as the filter paper 90 is loaded into the die.

In the next step of the process, the die half 83 and the retainer 89 approach the punch half 82 and the blankholder 84, it being irrelevant whether only the die half 83 with the retainer 89 moves, or only the punch half 82, or whether there is relative movement of all parts in concert. The die half 88 travels against the outer ring 87 of the blankholder 84 until the V-shaped elevations 95 on the outer ring 87 engage slightly within the V-shaped notches 96 on the die half 83. As this occurs, the outer regions of the round paper blanks 93 are pre-formed into slightly V-shaped notches 71 and roof-shaped elevations 72. Subsequently, the retainer 89 travels against the surface of the filter paper stack 112, biasing the underside 109 of the bottommost round paper blank 93, and hence the entire filter paper stack 112, against the surface 99 of the punch half 82. In this manner, the round paper blanks 93 are located and centered relative to the die assembly 92 as becomes apparent from FIG. 14.

Then either the die half 83 with the blankholder 84 travels against the punch half 82, or the punch half 82 enters into the ellipsoidal cavity 97 of the die half 83. While in the first variant the retainer 89 remains stationary during this travel and the die half 83 with its bore 100 of FIG. 14 slides along the outer surface 113 of the retainer 89, in the second variant the outer surface 113 slides along the bore 100 of the die half 83. Accordingly, as the punch half 82 enters the ellipsoidal cavity 97, the filter paper stack 112 engages the surface 99 of the punch half 82, in which process the area of the filter paper stack 112 that is slightly urged against the annular surface 103 of the die half 83 by the outer ring 87 slides radially inwardly, causing the die half 83 and the blankholder 84 to produce in the filter element 28 the trough pleats 51 and the crest pleats 52 according to FIGS. 8 to 10. As this occurs, the force exerted by the outer ring 87 on the filter paper stack 112 is of a magnitude just sufficient to maintain the stack adequately tensioned for the formation of the pleats 51, 52, while at the same time the radially outer edge of the filter paper stack 112 slides away inwardly out of the clearance space 85.

In the final step of the process, the inner ring 86 rests only slightly against the underside 109 of the filter paper stack 112. The deeper the punch half 82 travels into the cavity 97 of the die half 83, the more the filter paper stack 112 is deflected in the corner area 114 of the die half 83 and pressed into the V-shaped notches 96. According to the present invention, therefore, the filter paper stack 112 is virtually drawn over the corner area 114, while at the same time the die half 83 and the blankholder 84 operate to form the trough pleats 51 and the crest pleats 52 of FIGS. 8 to 10. This process continues until the position illustrated in FIG. 15 is reached in which the punch half 82 has completed its travel into the cavity 97. During the time the V-shaped elevations 95 are in engagement with the V-shaped notches 96, the filter paper stack 112 is pressed into its final shape, which also includes the inner region which does not slide over the corner area 114.

Then the punch half 82 is pressed firmly against the die half 83 and the retainer 89 so that the filter paper stack 112 is formed to its final shape according to FIGS. 8 to 10. During this pressing operation only the trough and crest pleats 51 and 52, respectively, are pressed, excluding however the side walls 53, 54 of FIG. 10. This is accomplished by suitably designing the notches 96 and elevations 95 in the die assembly 92. At the same time, the inner ring 86 is urged against the rim 39 of the filter paper stack 112, causing the clearance space 85 to be eliminated and the rims 39 of the filter paper stack 112 to be pressed against each other firmly to obtain a stable form of many filter elements 28 in the filter paper stack 112. After a predetermined dwell period the forming operation is completed.

According to FIG. 16, the die half 83 with retainer 89 then commences its upward travel out of the punch half 82, while yet the inner ring 86 continues to press firmly against the rim 39. Then the blankholder 84 moves away from the die half 83, so that the filter paper stack 112 is held in the die half 83 only due to its radial bias which acts against the inner wall 98 of the die half 83. In the event of the biasing force being inadequate, entailing the risk for the filter paper stack 112 to fall out of the cavity, provision may be made for a suction device (not shown) on the retainer 89 to cause the filter paper stack 112 to be maintained in firm engagement with the retainer 89.

Figure 17:
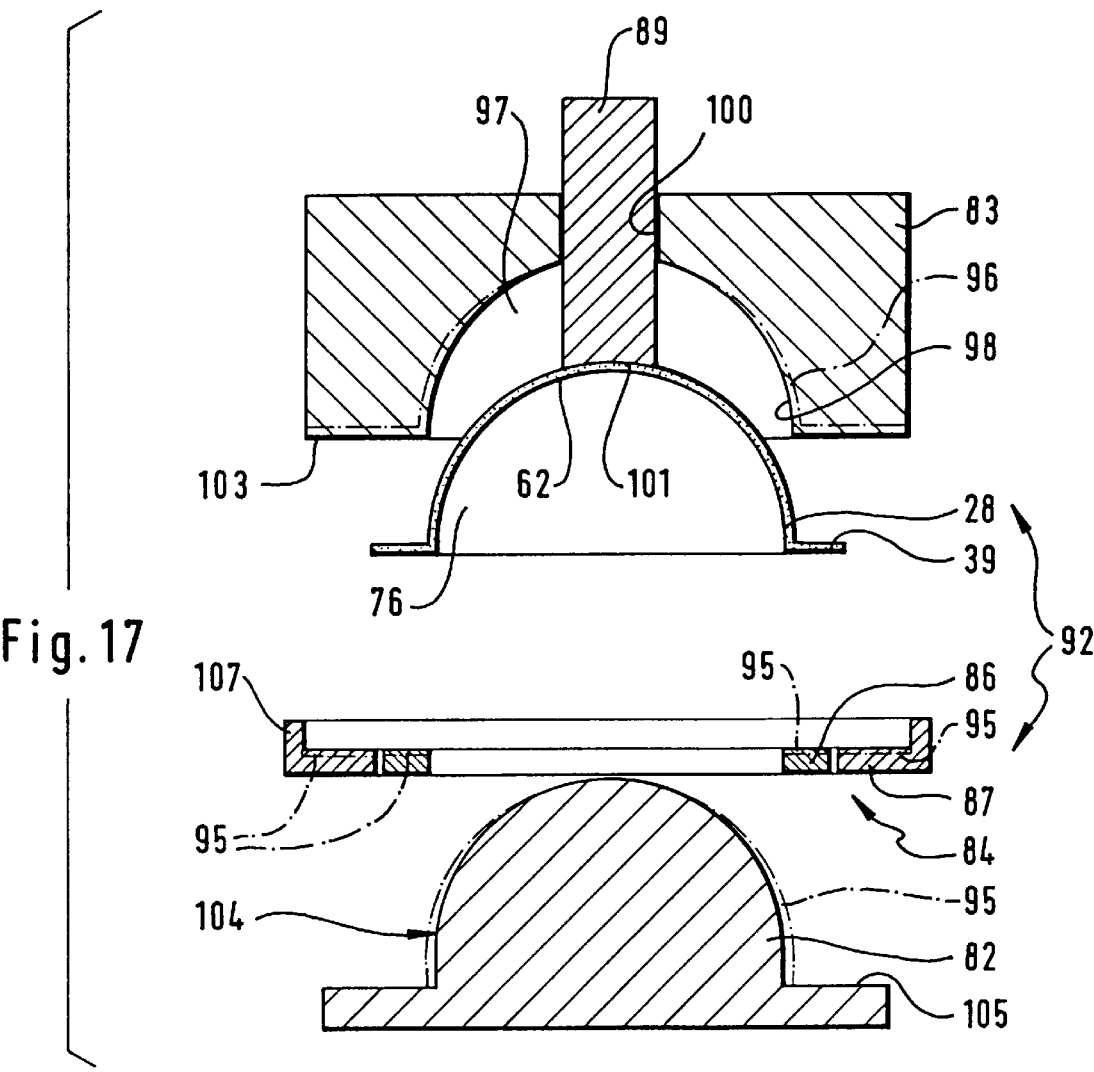

In the embodiment of the die assembly 92 of FIG. 17, the filter paper stack is intended to be held by a vacuum device not shown) provided in the retainer 89. To hold the filter paper stack 112 against the retainer 89, it can also be considered that provision is made for a platen device (not shown), which engages within the receiving cavity 76 while at the same time urging the bottom 62 against the inner surface 101 of the retainer 89. In a subsequent step, the retainer 89 can be made to travel into the die half 83 (FIG. 17) to enable the finished filter paper stack 112 to be withdrawn from the die assembly 92 and place it into a package conformably shaped to receive the filter paper stack 112. This then terminates the very simple process of manufacturing one or several filter elements 28.

What is claimed is:

1. A filtering device for making brewed beverages, comprising:
   a filter support defining a filter receiving cavity having an upper opening and including a supporting surface formed thereon and circumscribing the filter receiving cavity near the upper opening thereof; and
   a filter element fabricated from filter paper, the filter element having a materials receiving cavity to be filled with extractable materials which, following contact with hot water, deliver extractive substances to the water, resulting in a brewed beverage that is drained from the filter element, said filter element including a rim formed on the filter element and having a bearing surface, said rim extending in a direction away from the receiving cavity of the filter element outwardly, said bearing surface of the rim bearing against the supporting surface formed on the filter support upon insertion of the filter element into the filter support, and said rim of the filter element being reinforced mechanically by pleating the filter paper with outwardly extending pleats that also extend into the rim, the pleats being configured as exposed pleats so that paper surfaces do not overlap, the pleats in the area bounding the receiving cavity being equally spaced, the pleats in the rim and in the receiving cavity being of a zigzag or undulating structure in cross section, causing a crest pleat to be followed by a trough pleat in alternation in the circumferential direction of the filter element, in a radial direction of the filter element at a junction of a transition area with the rim, a crest pleat changing into a trough pleat and vice versa, the supporting surface of the filter support also being of a zigzag or undulating structure along its circumference as a result of which an elevation is followed by a recess in alternation in the circumferential direction of the filter support for cooperation with the crest pleats and the trough pleats of the rim of the filter element.

2. The filtering device as claimed in claim 1 wherein the rim is formed at an open end of the receiving cavity of the filter element.

3. The filtering device of claim 1 wherein the pleats in the area of the filter element bounding the receiving cavity are likewise configured as exposed pleats, whereby recesses and elevations are produced also in the area of the filter element bounding the receiving cavity, a transition area adjoins the supporting surface of the filter support, which transition area has a contour following the contour of the area of the filter element bounding the receiving cavity, and also the transition area has corresponding elevations and recesses along its circumference for cooperation with the recesses and elevations of the filter element.

4. The filtering device as claimed in claim 1 further comprising an upwardly open basket formed of individual braces and capable of receiving the filter element, said basket adjoining supporting surfaces of the filter support.

5. The filtering device as claimed in claim 4 wherein the braces on the basket are formed essentially only above a maximum filling level for extractable materials.

6. The filtering device as claimed in claim 1 wherein during the brewing cycle a water layer penetrates between the rim of the filter element and the supporting surface of the filter support, and said water layer produces an adhesive effect between the filter element and the filter support which contributes to the securing of the filter element onto the filter support.

7. The filtering device as claimed in claim 6 wherein the filter paper directs liquid to the rim by capillary action.

8. The filtering device as claimed in claim 1 wherein the angle between the supporting surface of the filter support and the vertical axis of the filtering device is no greater than 90°.

9. The filtering device as claimed in claim 1 further comprising a retaining device and wherein the rim of the filter element is additionally urged against the supporting surface on the filter support by the retaining device acting against the rim of the filter element.

10. The filtering device as claimed in claim 1 wherein the filter support includes a filter housing encompassing the filter element, wherein both the receiving cavity of the filter and filter housing have a corresponding outer contour and wherein the outer contour of the receiving cavity of the filter element and the outer contour of the filter housing each follow the contour of an ellipsoid, and the filter element, in suspended position, is invariably spaced from the filter housing.

11. The filtering device as claimed in claim 10 wherein the outer contour of the receiving cavity of the filter element and the outer contour of the filter housing are of a hemispherical configuration.

12. The filtering device as claimed in claim 1 wherein the filter support is composed of at least two parts.

13. The filtering device as claimed in claim 1 wherein the filtering device is part of an electrically powered beverage making apparatus for domestic use, in which water is heated in an electric water heater to be subsequently fed to a percolator disposed above the filtering device, whence it flows onto the extractable material, extracts extractive substances therefrom, and is drained as a brewed beverage.

14. A filter element fabricated from filter paper having a mouth and a receiving cavity to be filled with extractable materials, said filter element having a rim extending in a direction away from the receiving cavity, said rim including pleats for reinforcement, wherein the pleats are configured as exposed pleats so that paper surfaces do not overlap, wherein the area bounding the receiving cavity is equally pleated as a result of it being manufactured by forming from filter paper, the pleats in the rim and in the receiving cavity are of a zigzag or undulating structure in cross section, causing a crest pleat to be followed by a trough pleat in alternation in the circumferential direction of the filter element, and in the radial direction of the filter element at junction of a transition area with the rim a crest pleat changes into a trough pleat and vice versa.

15. The filter element as claimed in claim 14 wherein the filter paper is made of an annular filter paper blank.

16. The filter element as claimed in claim 14 wherein the filter element has a centrally located bottom and wherein the pleats extend in longitudinal direction of the filter element from an area of the bottom up into the rim.

17. The filter element as claimed in claim 15 wherein the pleats extend radially outwardly.

18. The filter element as claimed in claim 15 wherein a sharp corner is formed on the filter element at the junction of the rim with the transition area.

19. The filter element as claimed in claim 14 wherein the filter element is integrally made of filter paper, and said filter paper has a gsm substance of 20 to 60 grams per square meter.

20. The filter element as claimed in claim 14 wherein the outer contour of the receiving cavity of the filter element lies inside a space formed by the outer surfaces of two ellipsoids, and that nowhere in the space thus defined does the shortest relative distance of the two outer surfaces exceed 8 mm.

21. The filter element as claimed in claim 14 wherein in the area of the filter element bounding the receiving cavity at least some of the pleats start at different levels.

22. The filter element as claimed in claim 14 wherein the pleats have a depth that increases from their beginning radially outwardly.

23. The filter element as claimed in claim 14 wherein at least one tab is formed on the rim to aid in handling.

24. The filter element as claimed in claim 14 wherein the filter element is integrally made of filter paper, and said filter paper has a gsm substance of about 35 grams per square meter.

25. The filter element as claimed in claim 14 wherein in the area of the filter element bounding the receiving cavity the pleats alternative in length with two short pleats alternating with one long pleat.

* * * * *